Aug. 5, 1958 W. C. MASON 2,845,686
APPARATUS AND METHOD FOR FORMING ENDLESS FABRICS
Filed Dec. 2, 1955 15 Sheets-Sheet 1
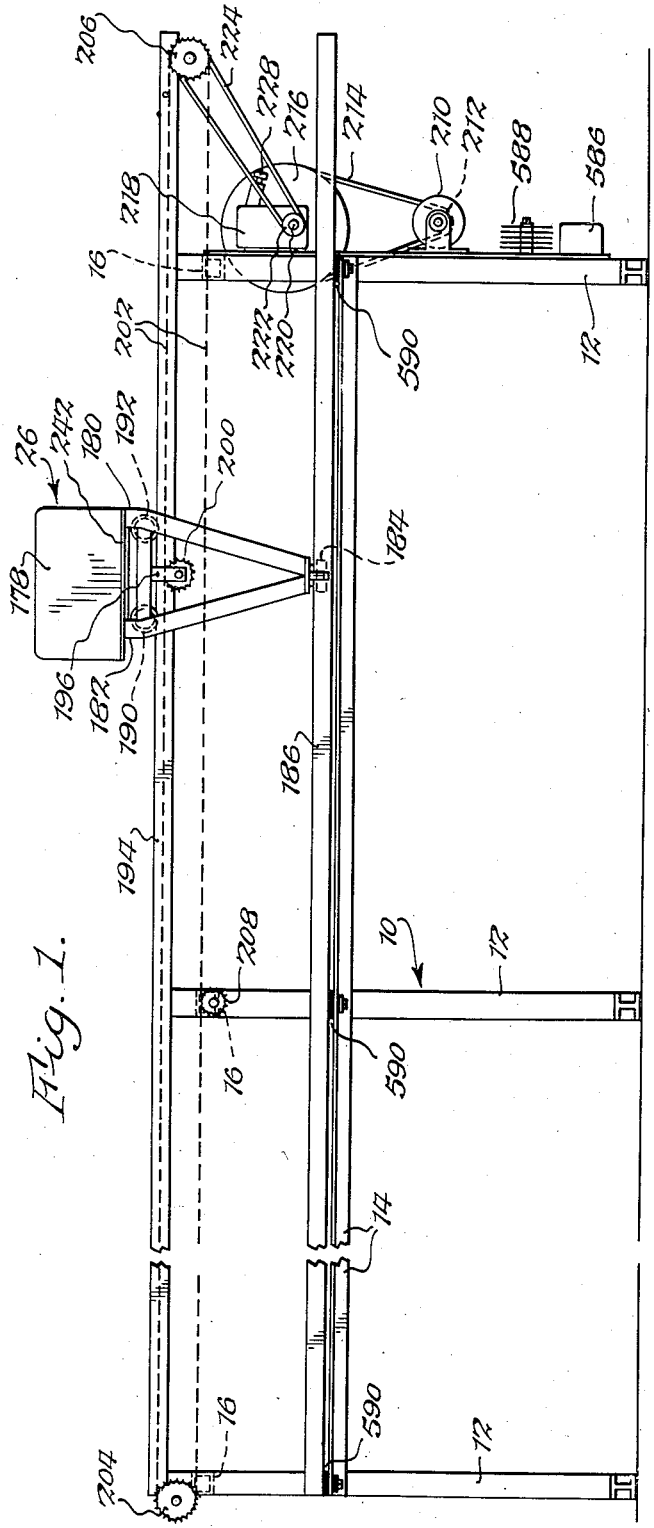
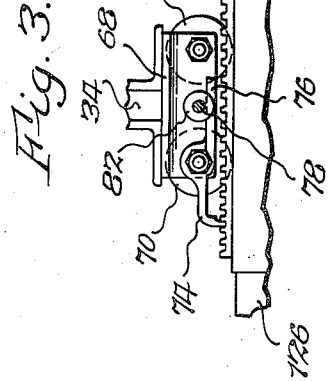
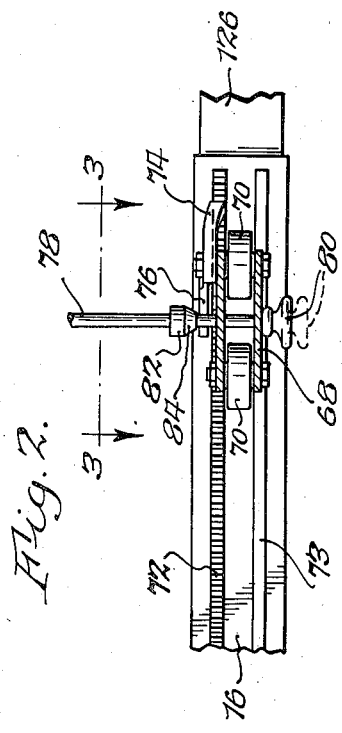

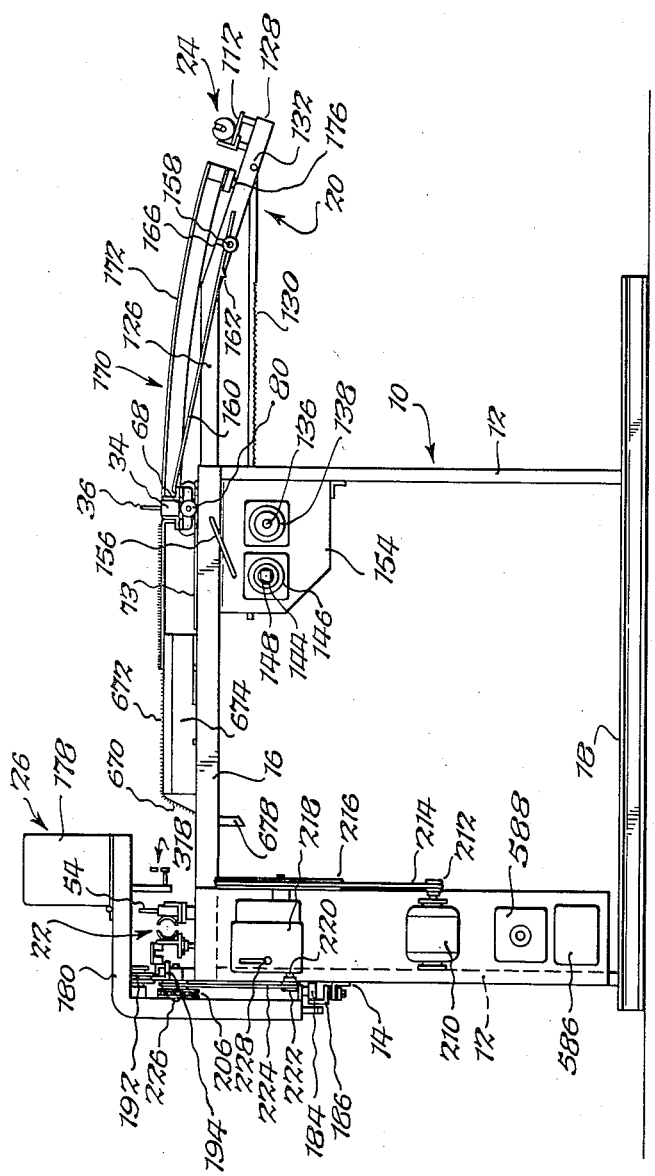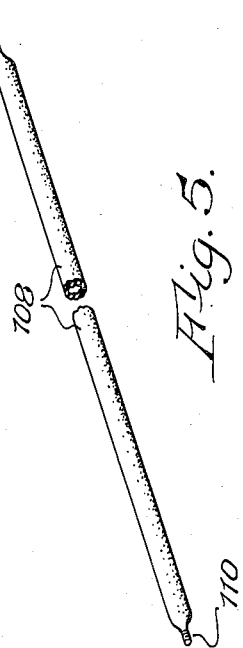

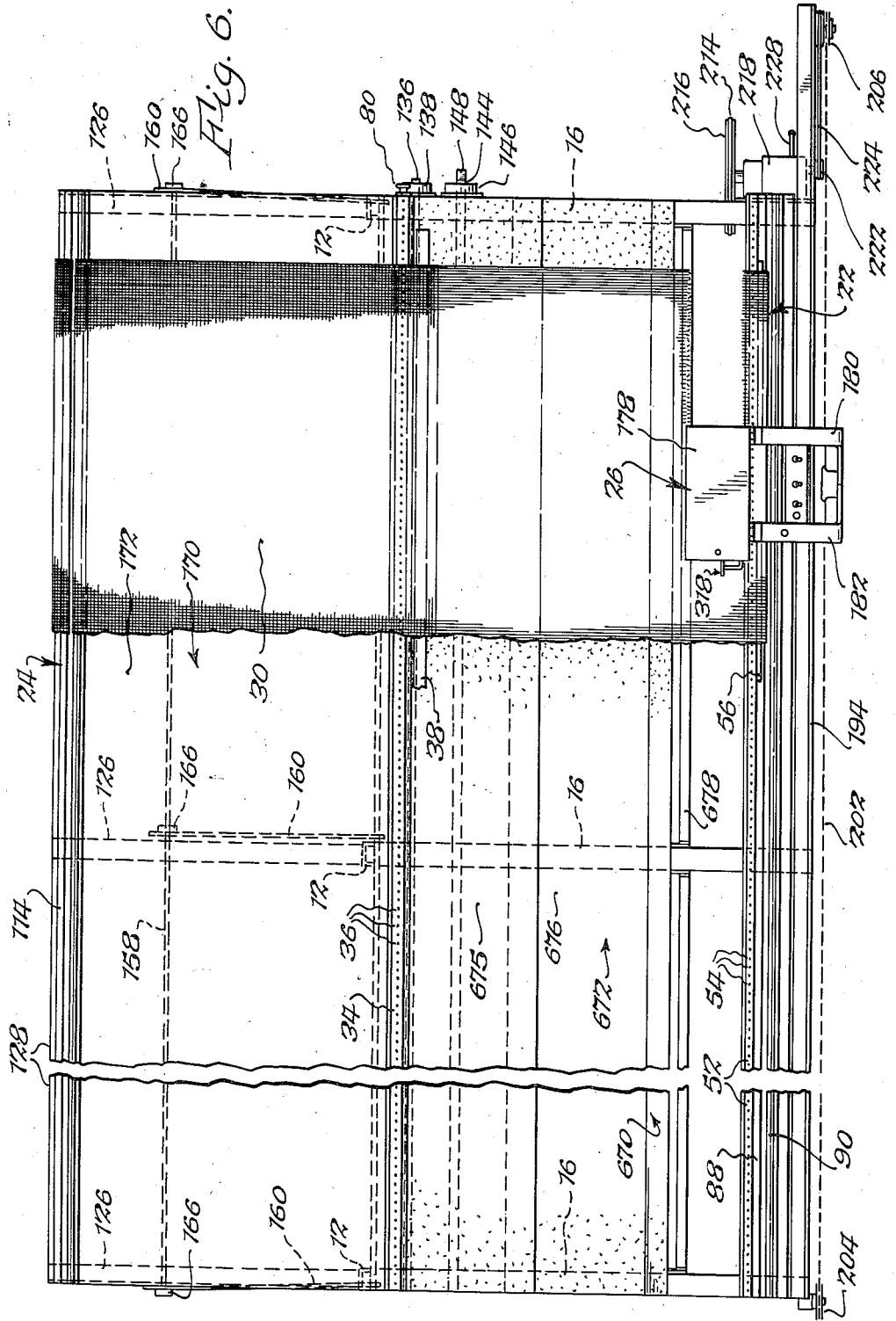

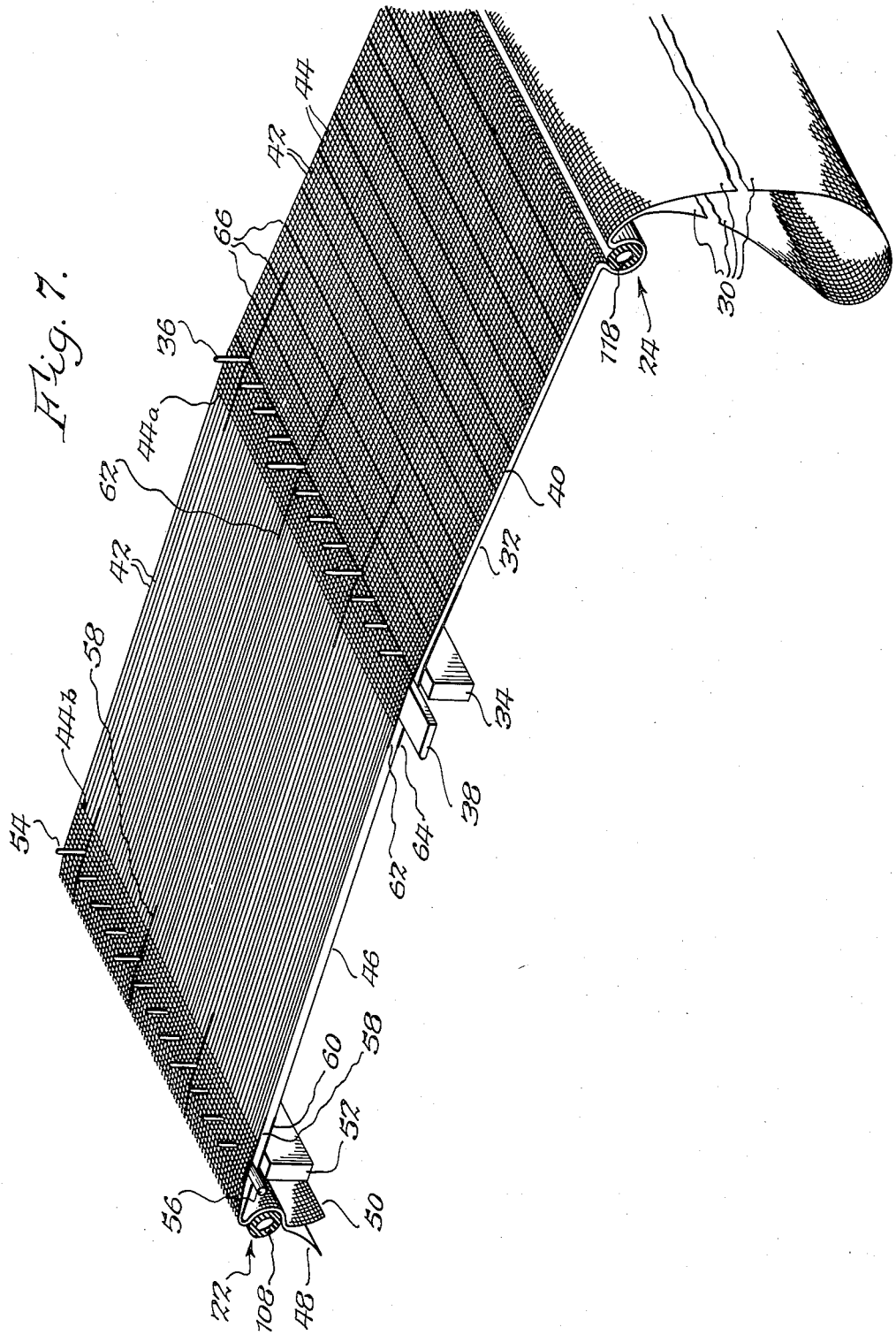

Aug. 5, 1958  W. C. MASON  2,845,686
APPARATUS AND METHOD FOR FORMING ENDLESS FABRICS
Filed Dec. 2, 1955  15 Sheets-Sheet 5
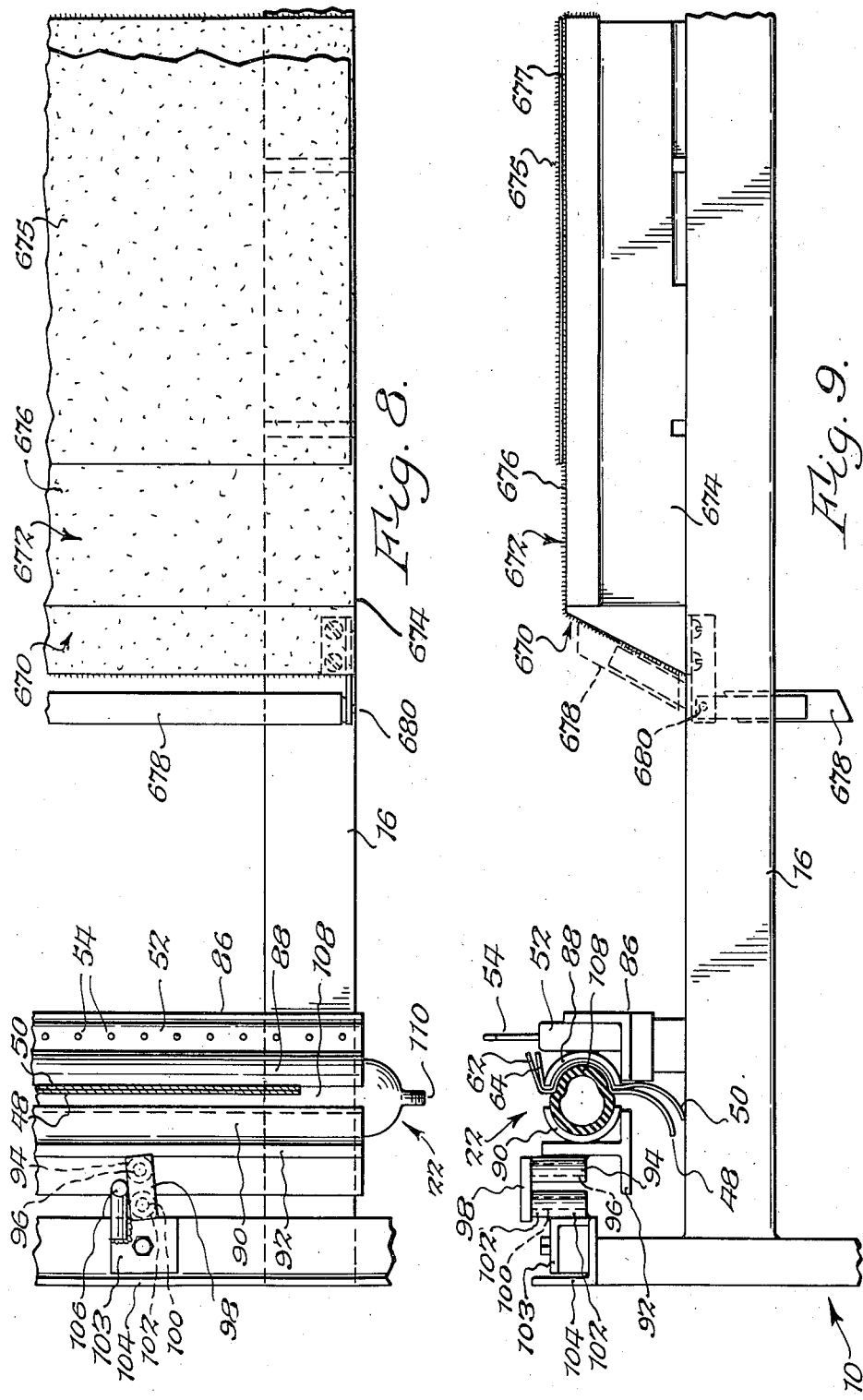

Aug. 5, 1958 W. C. MASON 2,845,686
APPARATUS AND METHOD FOR FORMING ENDLESS FABRICS
Filed Dec. 2, 1955 15 Sheets-Sheet 6

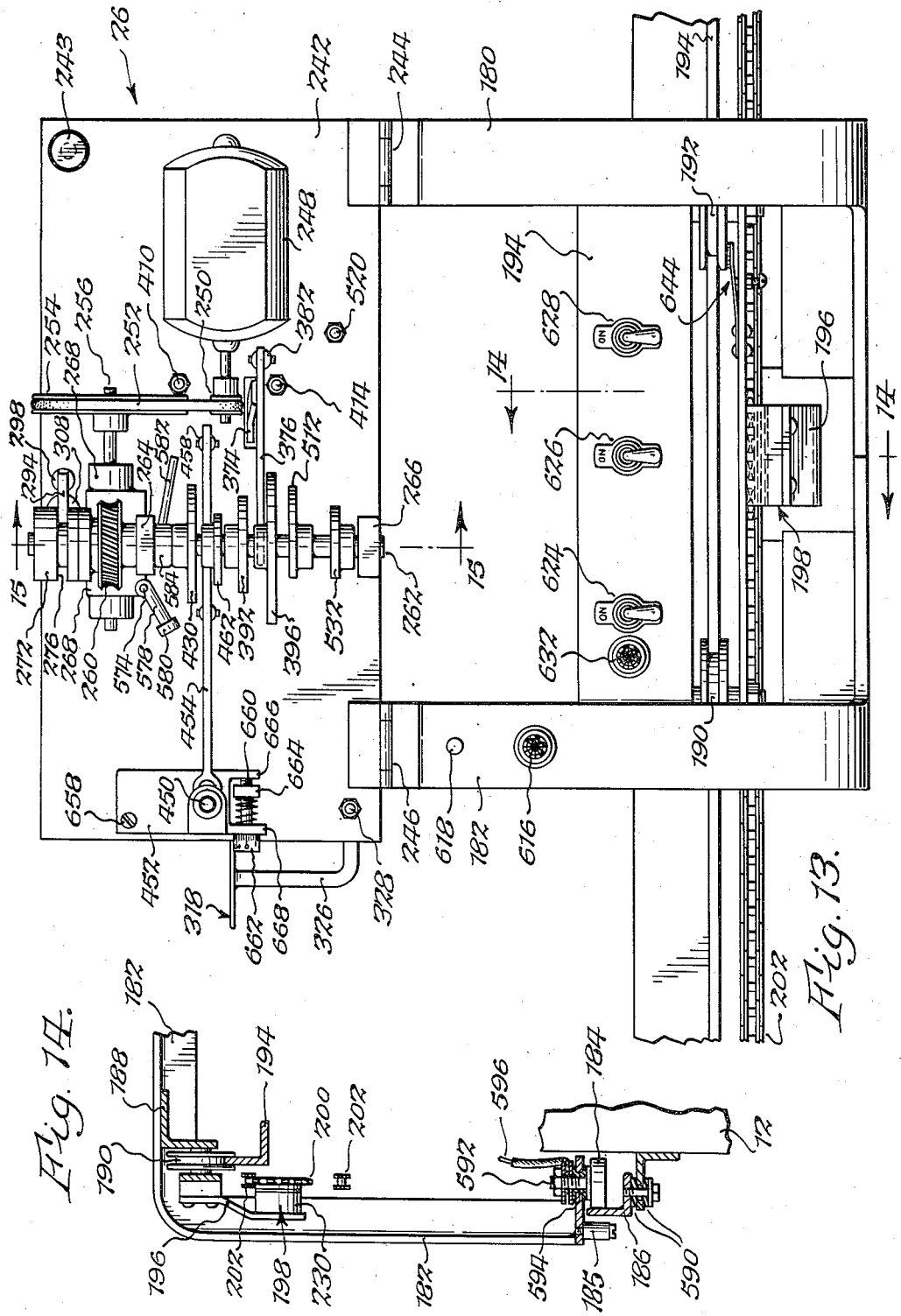

Aug. 5, 1958 W. C. MASON 2,845,686
APPARATUS AND METHOD FOR FORMING ENDLESS FABRICS
Filed Dec. 2, 1955 15 Sheets-Sheet 8
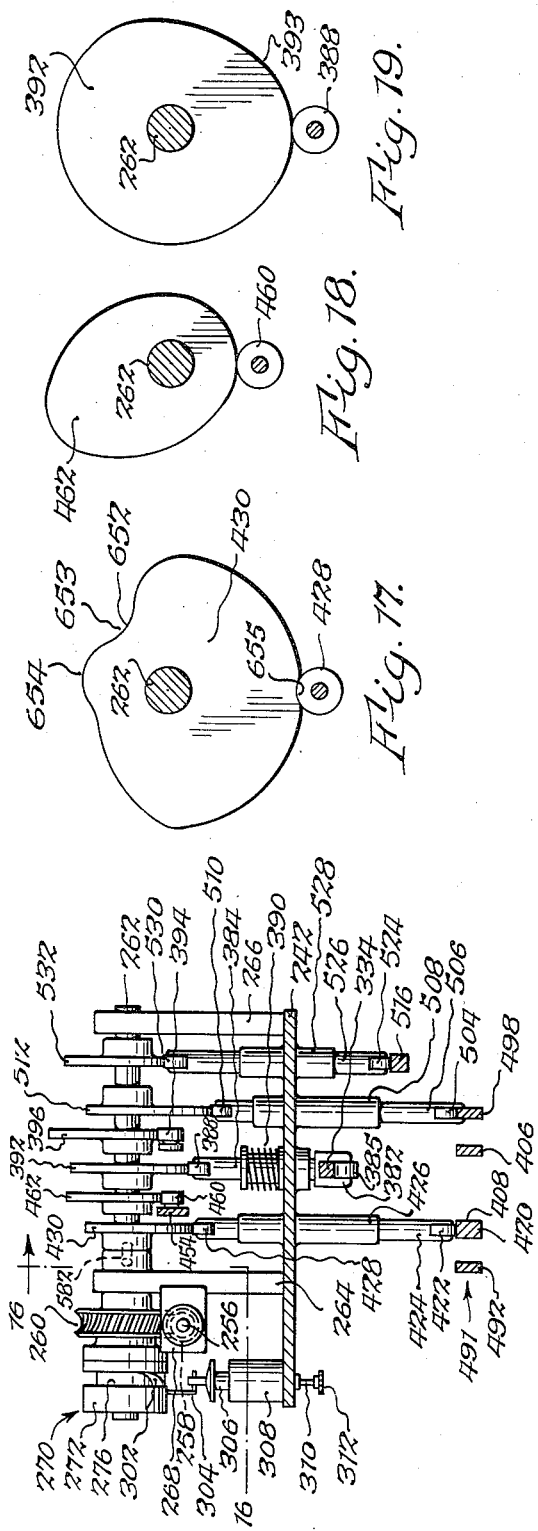
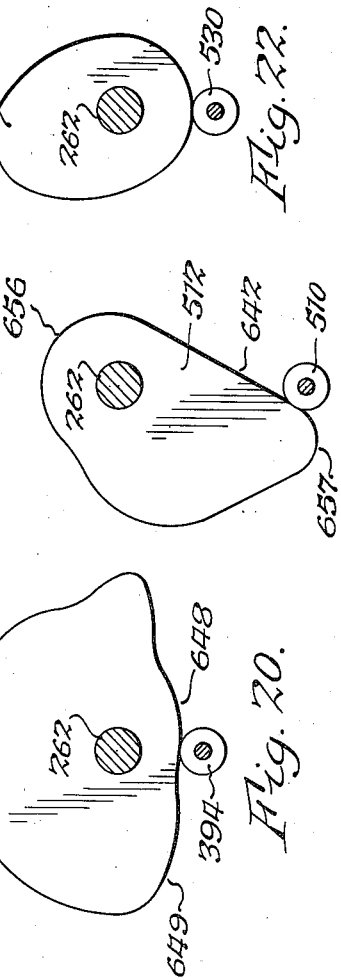
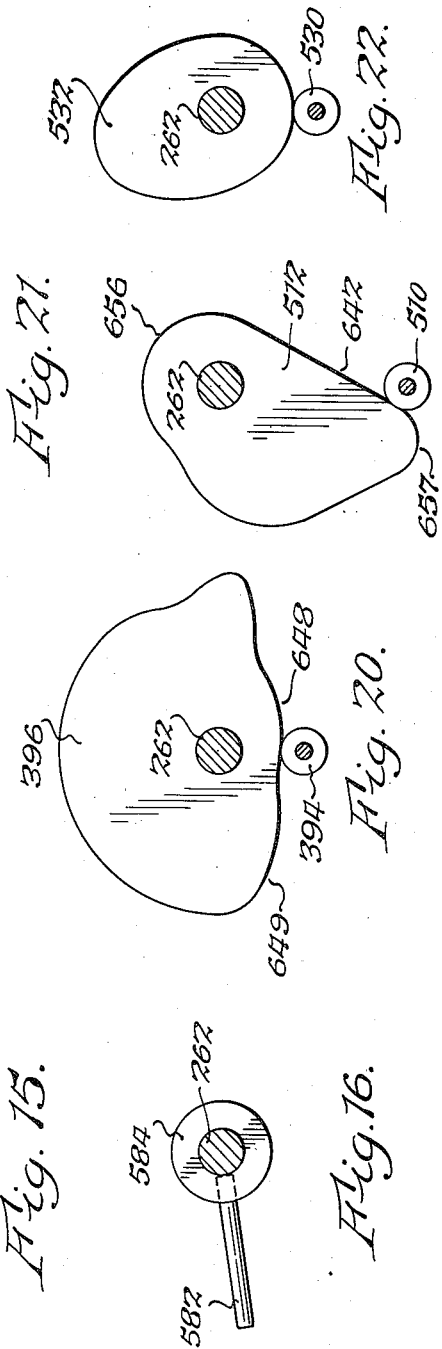

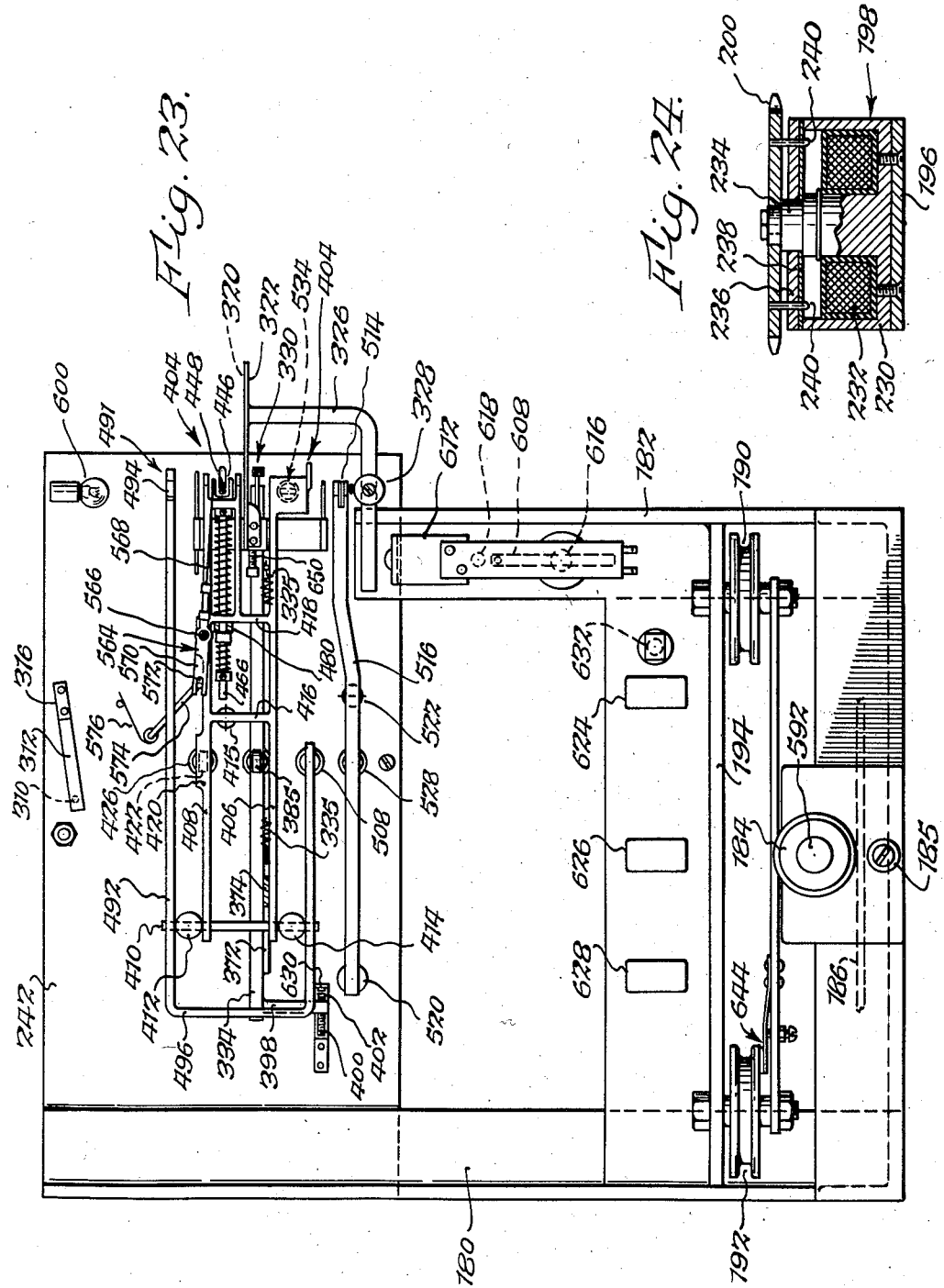

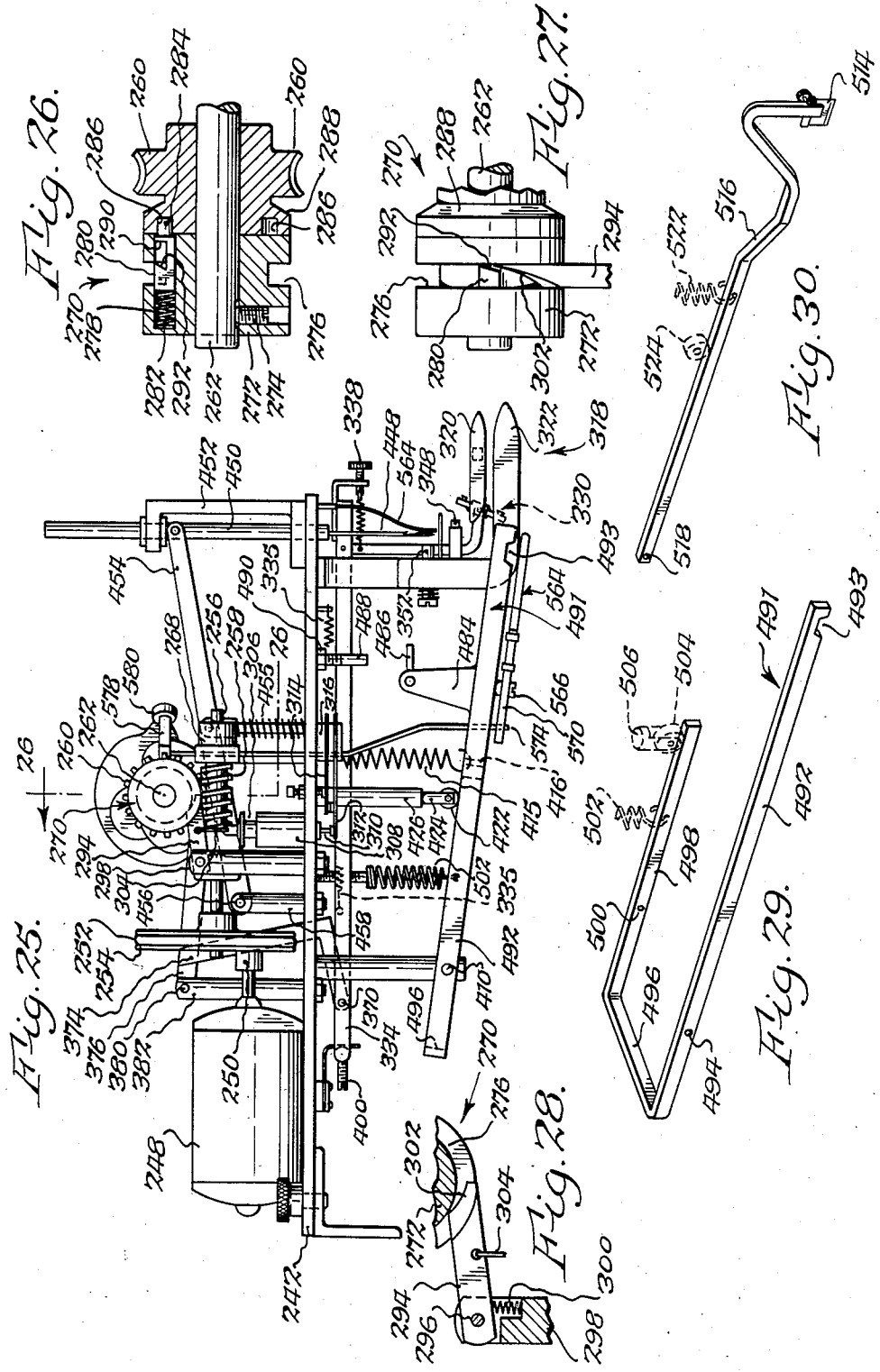

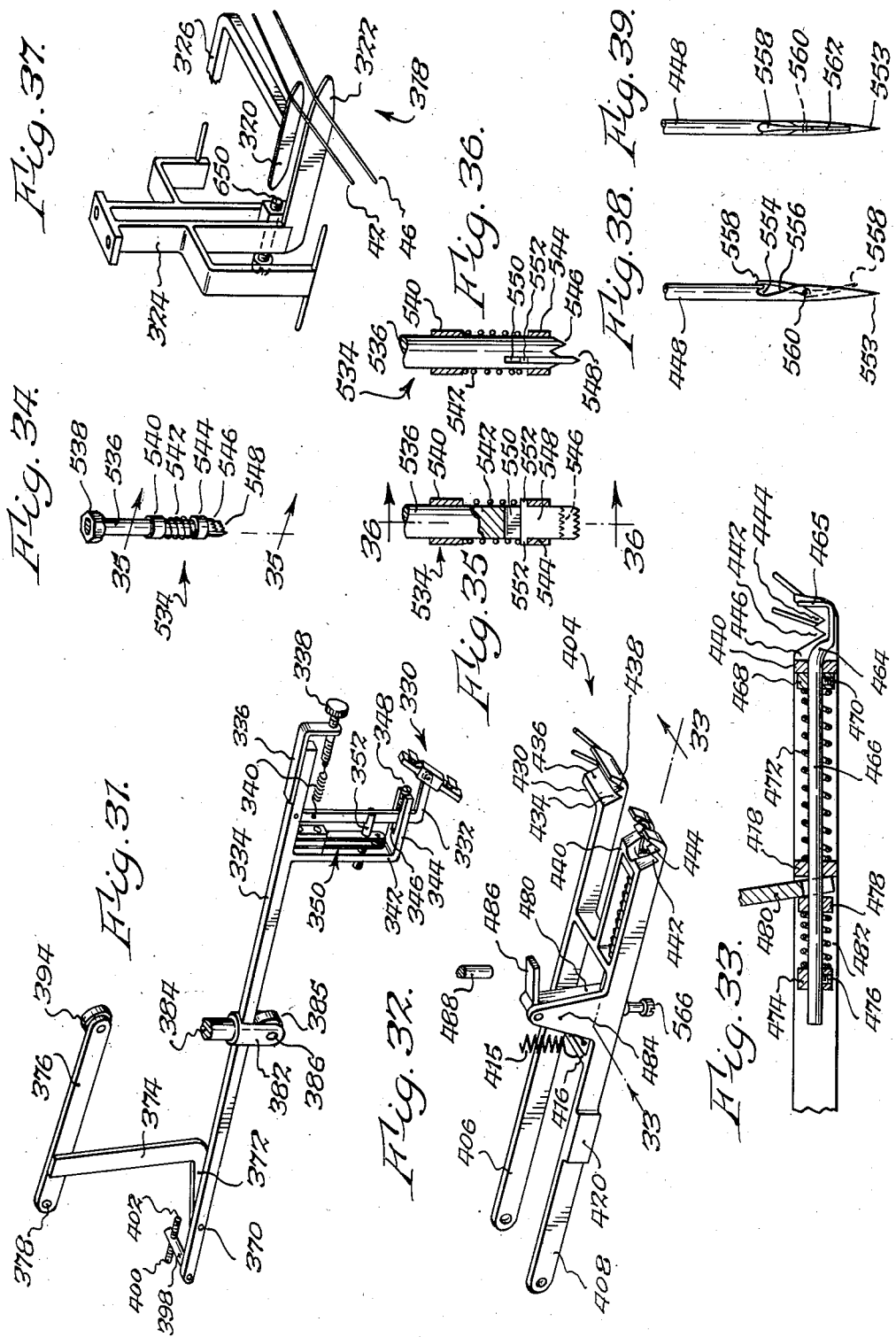

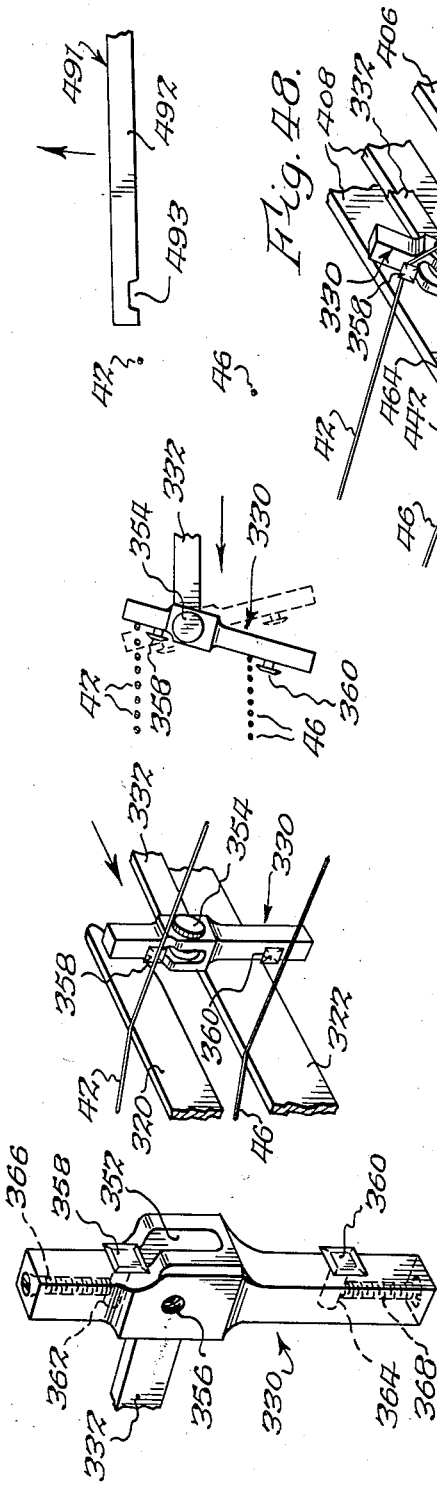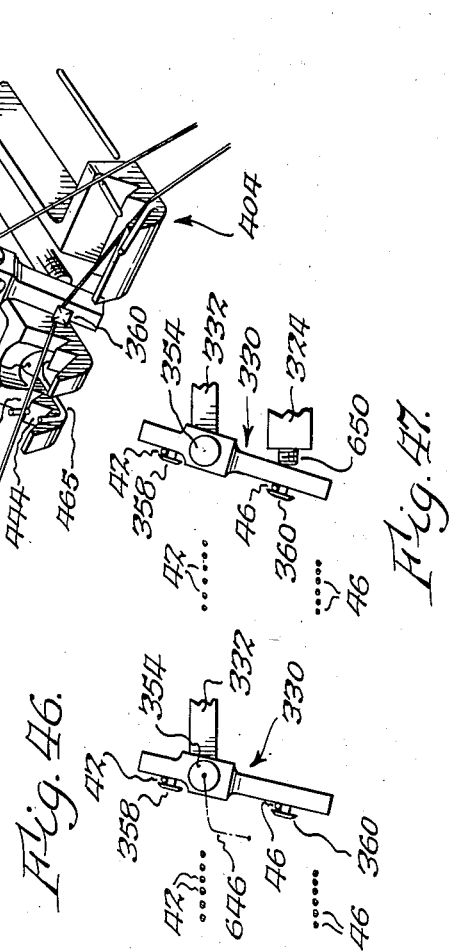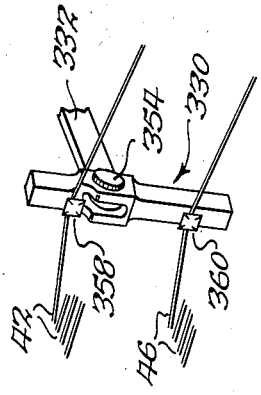

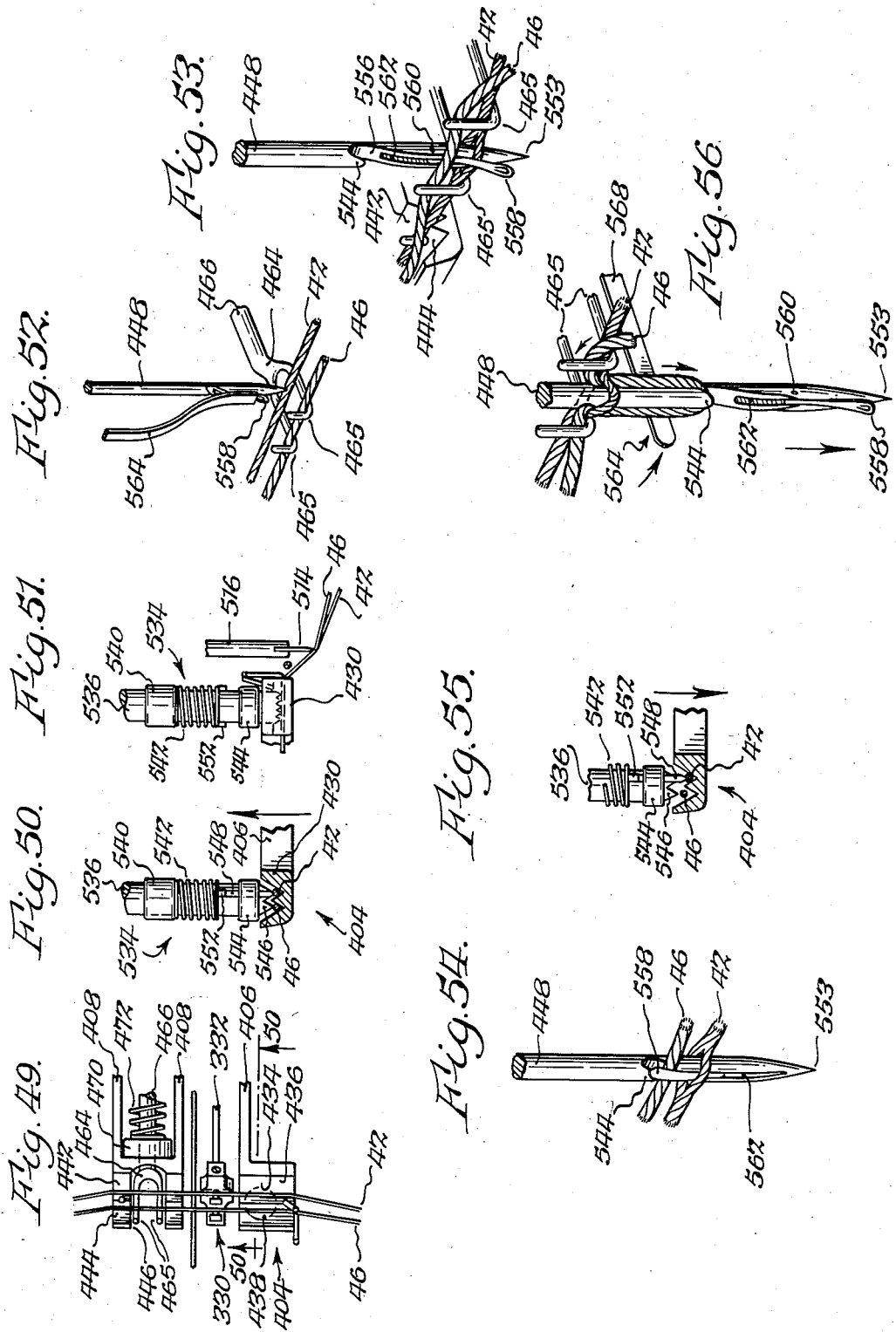

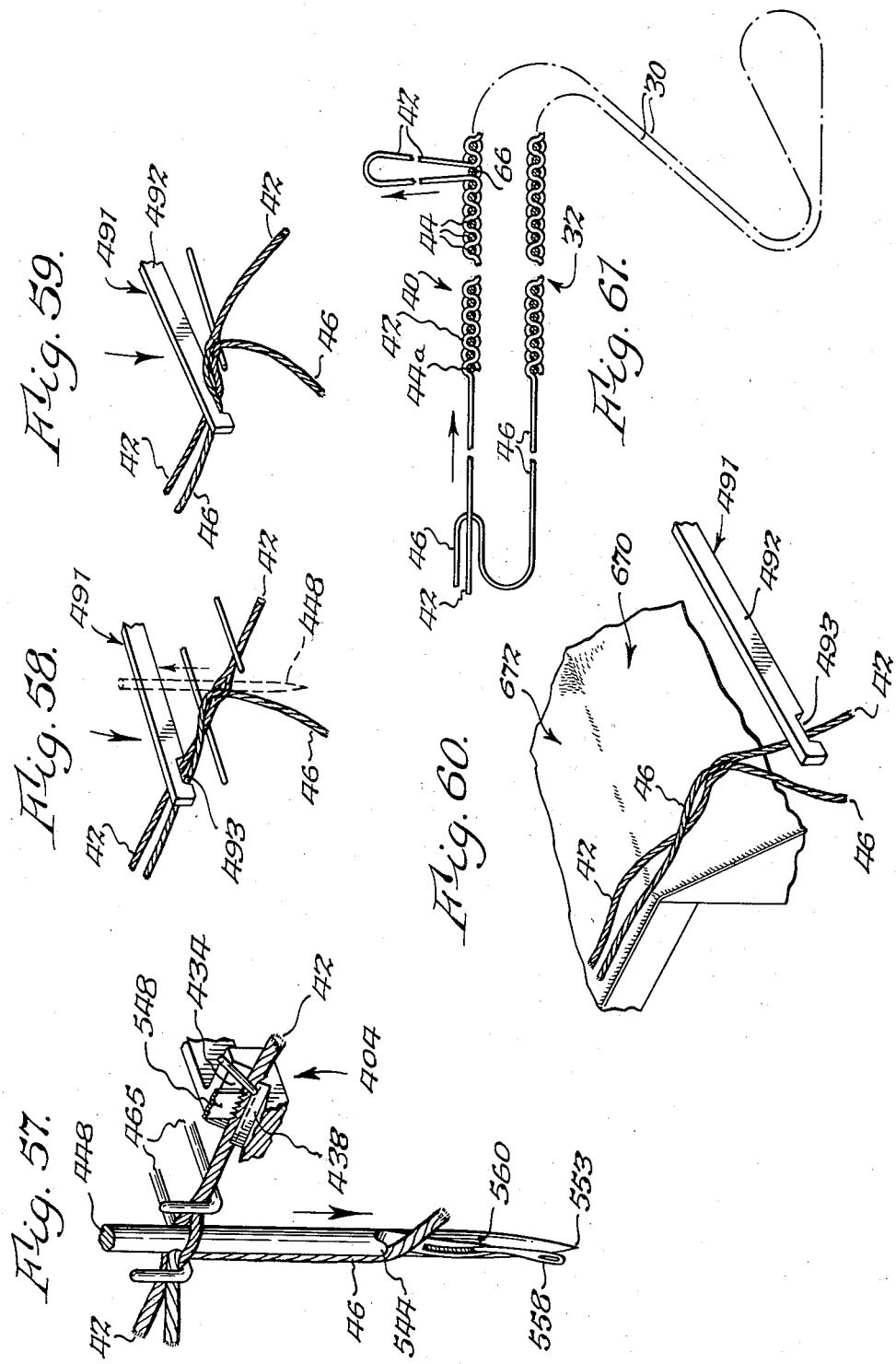

United States Patent Office 2,845,686
Patented Aug. 5, 1958

2,845,686

APPARATUS AND METHOD FOR FORMING ENDLESS FABRICS

William C. Mason, Slingerlands, N. Y., assignor to F. C. Huyck & Sons, Rensselaer, N. Y., a corporation of New York Application December 2, 1955, Serial No. 550,615

11 Claims. (Cl. 28—1)

The present invention relates to the splicing of fabrics and more particularly to mechanical equipment and a method for performing certain essential steps in the splicing of fabrics.

For certain specialized purposes fabrics are woven in continuous form of definite or indefinite length and the opposite ends of a definite length as woven or as cut from a longer piece are joined together by splicing to form an endless belt. A particularly important example of such a fabric is a papermakers felt. The forming of a splice is a very exacting procedure requiring various operations by highly skilled persons and it is therefore corresponding expensive and time consuming. In forming such a splice by hand, it is customary to omit or remove a number of the filler yarns whereby to form a fringe of warp yarns of suitable length at each end edge of the fabric. The fringed and edges are brought into generally abutting relationship and then the corresponding warp yarns or "ends" from each edge are tied together. It will be apparent that the tying operation must be very carefully and painstakingly executed inasmuch as each warp end must be tied to itself without fail throughout the width of the piece.

Thereafter the warp ends are individually picked up at points within the body of the fabric so as to draw the knot uniting that particular warp end with the corresponding warp end through the piece thereby drawing the corresponding end into the piece in the position formerly occupied by the withdrawn warp end. The tied-together ends thus protrude from the piece at the point where the first warp end was picked up and are later clipped close to the surface. In some instances half of the ends are drawn into one end edge portion of the piece and the other half of the ends are drawn into the other. In other instances, all of the warp ends from one end edge portion of the fabric are drawn into the opposite end edge portion. In all cases it is customary to stagger the points of emergence of the yarns over a wide area in a carefully distributed pattern to minimize ridges or uneven porosity. The drawing of all the ends into one edge portion has certain advantages since special knots may be employed which will move more readily in one direction than in the other. Also, all of the work of drawing-in may be performed in one end edge portion.

The present invention provides apparatus which eliminates certain of the hand operations described above. A major operation which is performed mechanically in accordance with the present invention is the selecting of corresponding warp ends and "tying" these ends together by inserting one warp end bodily through the other. Beyond this, the present invention provides supporting means upon which the fabric may be placed for the selecting operation and which facilitates the drawing in of the tied ends. The present invention also contemplates special weaving of the fabric at the opposite end portions to adapt it for use on the apparatus herein disclosed. It also contemplates the insertion of special filler yarns having a contrasting color or appearance to assist in establishing the regularly staggered pattern referred to above. It also contemplates the coloring or other identification of warp ends at predetermined regular intervals across the width of the fabric to assist in matching corresponding warp ends with one another when the fabric is placed upon the apparatus hereinbelow described.

It is an object of the present invention to provide apparatus and method for performing automatically certain of the essential steps in the splicing of woven fabrics. Other and further objects will become apparent upon a consideration of the following description of a preferred, but not necessarily the only form of the invention taken in connection with the drawings accompanying and forming a part of this specification.

In the drawings:

Fig. 1 is a front elevation of a machine embodying the present invention with certain parts omitted;

Fig. 2 is a section along the line 2—2 in Fig. 10;

Fig. 3 is a section along the line 3—3 in Fig. 2;

Fig. 4 is a right hand end elevation of the machine shown in Fig. 1;

Fig. 5 is a perspective view of a clamping tube employed in the machine as shown in Fig. 4;

Fig. 6 is a top plan view of the machine showing a piece of fabric positioned therein;

Fig. 7 is a perspective view of a piece of fabric in the position assumed in the machine together with certain of the parts of the machine for holding the fabric in such position;

Fig. 8 is a fragmentary plan view on a larger scale than Fig. 6;

Fig. 9 is a fragmentary right hand end elevation of the forward portion of the machine with parts in section along the line 9—9 in Fig. 8;

Fig. 10 is a fragmentary right hand end elevation of the rearward portion of the machine;

Fig. 11 is a view similar to Fig. 9 showing the rearward fabric clamp in section;

Fig. 12 is a section along the line 12—12 in Fig. 10;

Fig. 13 is a plan view of the tying unit with a protective cover removed;

Fig. 14 is a section along the line 14—14 in Fig. 13;

Fig. 15 is a section along the line 15—15 in Fig. 13;

Figs. 16 through 22 are respectively sections along the lines 16—16, 17—17, 18—18, 19—19, 20—20, 21—21, 22—22, in Fig. 15;

Fig. 23 is a bottom plan view of the tying unit;

Fig. 24 is a section along the line 24—24 in Fig. 14;

Fig. 25 is a rear elevation of the tying unit taken from the line 25—25 in Fig. 6, the protective cover being removed;

Fig. 26 is a section along the line 26—26 in Fig. 25;

Fig. 27 is a bottom plan view of the parts shown in section in Fig. 26;

Fig. 28 is a section along the line 28—28 in Fig. 27;

Figs. 29 through 32 are perspective views of parts shown in Figs. 23 and 25;

Fig. 33 is a section along the line 33—33 in Fig. 32;

Fig. 34 is a perspective view of a part shown in Figs. 23 and 25;

Fig. 35 is a section along the line 35—35 in Fig. 34;

Fig. 36 is a section along the line 36—36 in Fig. 35;

Fig. 37 is a perspective view of parts shown in Figs. 23 and 25;

Figs. 38 and 39 are front and side elevational views respectively of a needle shown in Figs. 23 and 25;

Fig. 41 is a perspective view of a feeler forming a part of the tying unit illustrated in Figs. 23 and 25;

Figs. 42 through 60 are detail views of parts of the tying unit illustrating progressively the operations thereof in a cycle of operation of the tying unit; and Fig. 61 is a somewhat diagrammatic illustration of the manner in which warp ends "tied" in accordance with the present invention are drawn in for forming a splice.

Figure 40:
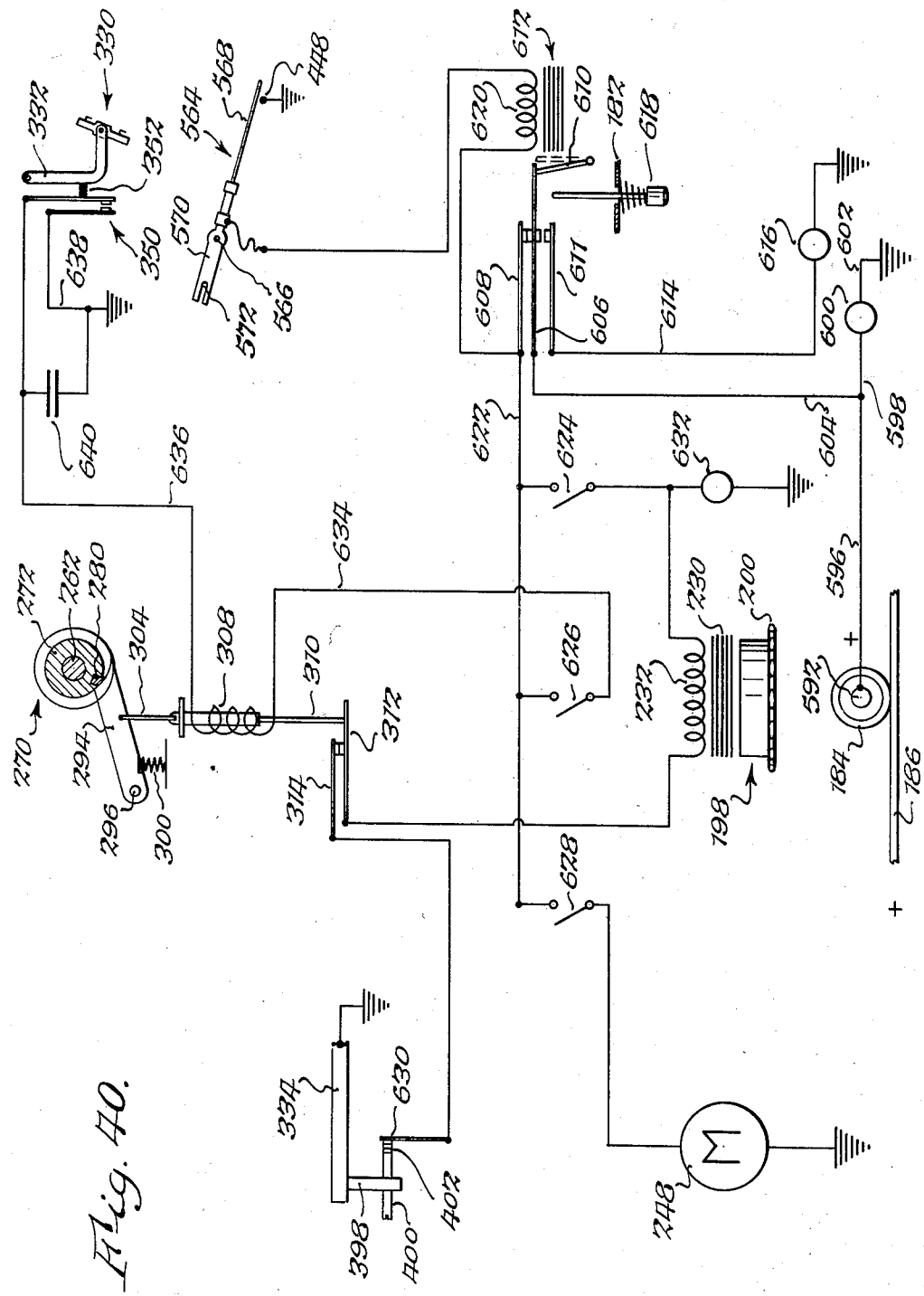
Fig. 40 is a wiring diagram of the tying unit.

Referring now to the drawings, there is shown one exemplary form of a machine for performing the various operations outlined above in the general description of this invention. Such machine comprises a frame indicated generally at 10 which includes vertically disposed legs 12 and horizontally disposed longitudinal frame members 14 and 16, all as viewed in Fig. 1. In Fig. 4 there is shown horizontal transverse frame members 16 and 18. The frame members just described make up a generally rectangular hollow frame work having an overall length, as established by the longitudinal members such as 14 and 16, which may be at least equal to the maximum width of fabric which it is desired to handle on the machine. It should be noted, however, that it is not necessary that the frame have such length inasmuch as fabrics wider than the machine may be handled thereon by increments of width commensurate with the useable dimensions of the machine. For the purpose of illustration of the present invention, it will be assumed that the machine is of adequate width to handle fabrics such as those used as papermakers felts on either the wet or dry end of the papermaking machine.

General description

In general, the machine of the present invention includes the frame 10, a tensioning frame indicated generally at 20 (see Fig. 4), fabric gripping devices 22 and 24 mounted respectively upon the frame 10 and the tensioning frame 20 and a yarn-tying carriage 26 which is movable lonigtudinally of the frame 10. The end edge portions of fabric which are to be joined by splicing are placed in superimposed relationship upon the frames 10 and 20 with the warp ends parallel and arranged with corresponding ends, actually the opposite extremities of the same warp yarn, in vertical alignment in the region of the path of the yarn-typing carriage 26. The carriage 26 is provided with mechanism for moving it intermittently and automatically to bring it successively into contact with the pairs of vertically aligned corresponding warp ends. Upon each such contact the carriage 26 and the selecting and tying mechanism forming a part of the carriage 26 thereupon will grip the pair of ends, cut them free from the extreme ends of the fabric and insert one of the selected warp ends through the body of the corresponding warp end, that is, one extremity of each warp yarn is inserted through its own opposite extremity. The carriage 26 then resumes travel for engagement with the next succeeding vertically aligned pair of warp ends. After all of the corresponding ends in a selected width or in the full width of the fabric have been united as aforesaid, certain elements of the machine forming the present invention are availed of to facilitate the drawing in operation by which the making of a splice is completed.

Although the united warp ends may be referred to herein as "tied," it will be understood that union between the two ends is formed by needling through rather than by the formation of any of the familiar forms of knots. The union formed by needling through lends itself admirably to being drawn through the fabric at least in one direction, i. e., that in which the warp end through which the corresponding warp end has been inserted is drawn backwardly through the end edge portion in which it was initially positioned in weaving. If so desired, the warp ends united by the present apparatus may have applied thereto an adhesive or friction increasing or fiber bonding substance to reduce the likelihood of slippage of the inserted yarn relative to the yarn in which it is inserted.

Construction of fabric and means for positioning fabric

Referring now to Fig. 7, there are shown two end edge portions of a fabric structure 30 such as papermakers felt which are to be united by splicing. As shown in said Fig. 7, the lower end edge portion 32 extends from the gripping device 24 across a stationary bar 34 containing a series of pins 36 and beneath the spacer bar 38. The upper end edge portion 40 of the fabric 30 extends from the gripping device 24 across the bar 34 and pins 36 and above the spacer bar 38. Both of the end edge portions are preferably woven specially for use on the apparatus of the present invention. Thus it will be observed that the upper end edge portion 40, for example, is made up of warp yarns 42 and weft or filler yarns 44 which may be interwoven in any conventional pattern. However, for a substantial length of the fabric, filler yarns are omitted whereby between the filler yarn 44a and the filler yarn 44b there is a considerable length of fabric in which the warps 42 extend in parallel unwoven relationship. As indicated above, the other end edge portion 32 of the fabric is substantially identical in structure whereby warps 46 extend in parallel unwoven relationship as shown in Fig. 7. At the extreme end edges of the fabric 30, filler yarns starting with the filler yarn 44b, for example, are again woven in any conventional relationship with the warps 42 or 46 whereby to provide relatively narrow woven areas beyond the unwoven areas just described. These woven areas are indicated generally by the reference characters 48 and 50. It will be understood that the special construction of the end edge areas of the fabric 30 may be provided at the beginning and the end, respectively, of the weaving operation when a fabric 30 of predetermined length is produced. Thus when weaving begins, filler yarns may be supplied in the usual fashion for several inches of the length of the piece to form one extreme end edge portion 48 or 50 after which filler yarns are omitted while the take-up mechanism is operated to wind a desired length of unwoven warp yarns such as 42 or 46 on the take-up roll. Supplying of filler yarns may then be resumed as by the insertion of the filler 44a and the major length of the fabric may then be woven in the usual manner. When the desired length has been achieved, fillers may be omitted while the take-up mechanism is operated to place a corresponding length of unwoven warp yarns 42 or 46 on the take-up roll after which fillers may be supplied to weave several inches of fabric which will comprise the other extreme end edge 48 or 50.

Alternatively, the length of fabric 30 may be woven in the usual fashion or cut from a piece of greater length and an appropriate number of fillers may be removed in the end edge portions to provide the necessary extent of unwoven warp yarn lying between the woven body of the fabric 30 and the woven extreme end edge portions 48 and 50.

In either event the extent of unwoven warp is determined by the dimensions of the particular machine, embodying the present invention, which is to be utilized. From an inspection of Fig. 7, it will be apparent that the lower end edge portion 32 of the fabric 30 extends from the spacer bar 38 to a bar 52 on which is mounted a plurality of pins 54 and beneath a spacer rod 56 to the gripping device 22. The upper end edge portion 40 extends from the spacer bar 38 over the bar 52 and spacer rod 56 into the gripping device 22. It will be apparent that the special weaving described above provides woven portions of the fabric 30 for engagement with the pins 36 and 54 while the major portion of the fabric extending between the pins 36 and 54 comprises unwoven parallel warp yarns 42 and 46.

While describing the special construction of the fabric 30 for use in the present invention it would be appropriate to point out that, if so desired, certain other steps may be taken on the fabric before it is positioned in the machine of the present invention. For example, as shown in Fig. 7, the warp yarns at both ends of the fabric 30 may be colored in some contrasting fashion at regular intervals throughout the width of the fabric 30 in the zones thereof which are to be applied to the pins 36 or 54. Thus, for example, every tenth or twentieth warp yarn 42 may have a contrasting coloring material applied to it as indicated at 58 in the region of the pins 54 while the warp yarns 46 may be similarly colored at identical intervals as indicated at 60. Also, color may be applied at 62 and 64, respectively, to the warp yarns 42 and 46 in the region of the pins 36. It will be understood that in the usual operation the end edges to be spliced constitute the opposite ends of the same piece of fabric and thus the colored portions 60 and 64 on the warp yarns herein identified at 46 will actually be on the opposite end of the same yarn as the colored portions 58 and 62 which are on the warp yarns herein identified at 42. Color may be applied while the fabric is in the loom by stopping the loom at an appropriate point and applying paint, dye or similar substance to the selected warps. The colored portions thus supplied are availed of in the present invention for assuring proper matching of corresponding warp ends. In Fig. 7, it will be observed that the colored portions 58 and 60 are arranged in vertical alignment and other colored portions will be similarly aligned, thus making it possible to readily observe whether proper matching of warp ends has been effected. A similar result may be achieved by providing full length warps of contrasting color or appearance at regular intervals in the width of the piece. In either event the coloring material may be water soluble if it is desired to remove the color from the completed spliced article.

Also during the weaving operation, it may be desirable to insert fillers having a contrasting color or other appearance in at least the upper end edge portion 40 of the fabric 30 to assist in forming a suitable regularly staggered splicing pattern. Such special fillers are indicated at 66 and may comprise colored yarns otherwise identical with the remaining fillers in the fabric or may comprise special colored yarns of any desired construction which are inserted alongside a regular filler and which eventually may be removed from the fabric if so desired. In either event, it will be understood that the normal weaving operation will be interrupted at appropriate points for the insertion of the special or additional colored yarn.

The pins 54 and the bar 52 on which they are carried are mounted in a fixed position on the frame while the pins 36 and the bar 34 on which they are carried are mounted for movement in a horizontal plane upon the frame 10. The relative movement thus provided is availed of for applying tension to the unwoven lengths of the warp ends 42 and 46. Referring particularly to Figs. 2, 3, 4 and 10, it will be observed that the bar 34 is carried on a plurality of carriages 68 each provided with rollers 70 which bear upon a horizontal frame member such as 16, as shown in Fig. 10. A toothed rack 72 is fixed to each such frame member adjacent the path of the roller 70 and each of the carriages 68 is provided with a gravity actuated pawl 74 which tends to set into the teeth of the rack 72. The toothed rack 72 and another parallel bar 73 serve to guide the carriage 68 in its movement left or right as viewed in Fig. 2. Each pawl 74 is pivoted on the associated carriage 68 and is provided with a tail 76 which lies under a horizontally disposed rod 78 extending through suitable openings in the carriages 68 all the way across the machine. At the end of the machine, as shown in elevation in Fig. 4, the rod 78 is provided with a knob 80 by which the rod 78 may be moved lengthwise of the machine. Adjacent each of the carriages the rod 78 has fixed thereon a cam 82 having a cylindrical body and a frusto-conical portion 84 extending toward the associated tail 76. The parts are so proportioned that when the rod 78 assumes the position shown in full lines in Fig. 2, the cams 82 are out of contact with the tails 76 whereby under the influence of gravity the pawls 74 will enter the teeth of the racks 72. When the rod 78 is moved lengthwise into the position indicated in broken lines in Fig. 2, the conical surfaces 84 will depress the tails 76 and the cylindrical bodies of the cams will become positioned above the tails whereby to hold the pawls 74 out of engagement with the racks 72. Thus the pins 36 may be locked to the frame 10 or may be released for movement relative thereto for purposes which will be described herebelow.

The pins 54 and the bar 52 in which they are mounted are fixed to a suitable bracket 86 mounted on the frame 10. (See Figs. 8 and 9.)

The fabric gripping device 22 is shown in detail in Figs. 8 and 9. It comprises a semi-cylindrical trough member 88 extending lengthwise of the machine and fixed to the brackets 86 and a second semi-cylindrical trough member 90 carried by a rigid bar 92 which is mounted for limited movement in a horizontal plane to vary the spacing between the trough members 90 and 88. The bar 92 is provided with a plurality of bosses 94 which receive pivot pins 96 secured to links 98. At the other ends of the links 98 there are provided pivot pins 100 which enter bosses 102 fixed to a bracket 103 on angle 104 extending longitudinally of the machine and which is rigidly secured to the frame 10. The angle 104 also carries stops 106 (see Fig. 8) associated with each of the links 98 and against which the links may rest in slightly over centered position so as to firmly maintain the trough member 90 in a definite position relatively close to the trough member 88. When it is desired to grip fabric in the gripping device 22, the trough member 90 is moved away from the trough member 88 by swinging the links 98 away from the stops 106. Fabric ends such as 48 and 50 are inserted between the trough members. An inflatable tube 108 made of rubber or similar expansible material and shown in elevation in Fig. 5, is inserted between the trough members confining the ends 48 and 50 between the body thereof and the trough member 88. The trough member 90 is then moved into the position illustrated in Fig. 8 and the inflatable tube 108 is inflated with air through a suitable valve 110. The fabric is thus firmly and evenly gripped throughout its width.

The fabric gripping device 24 (see Fig. 4) which is carried by the tensioning frame 20 is similar to the one just described although it may be simpler in construction. Thus referring to Figs. 10 and 11, it will be observed that the gripping device 24 is carried by suitable brackets indicated generally at 112 fixed upon the tensioning frame 20. The gripping device 24 consists of a trough 114 of generally cylindrical conformation having a slot 116 extending longitudinally thereof through which the fabric and an inflatable tube 118 similar in all respects to the inflatable tube 108 may be inserted. The opposite ends of the trough 114 may be closed by generally circular discs 120 having a radially extending slot 122 to receive the tapered opposite ends of the inflatable tube 118 thus providing access to the valve 124 provided at at least one end thereof. As a matter of convenience, both the inflatable tubes 108 and 118 may be provided with valves at both ends since it will be understood that the machine may be quite wide and setting up thereof is facilitated if the tubes may be inflated or deflated from either end of the machine.

A tensioning frame 20, as shown particularly in Figs. 4 and 10, includes a plurality of spaced parallel frame members 126 which are adapted to telescope respectively into the horizontal members 16 of the frame 10. The members 126 preferably are downwardly inclined toward the right hand ends thereof as viewed in Figs. 4 and 10, The members 126 are joined along their outer ends by a longitudinal frame member 128 (see Fig. 6) to form a rigid unit. The tensioning frame 20 thus may be moved relative to the main frame 10 by telescoping the members 126 into the frame members 16 to a greater or lesser extent and the fabric gripping device 24 carried by the frame 20 will maintain a parallel relationship with the other longitudinally extending members of the machine such, for example, as the rows of pins 36 and 54.

For moving the tensioning frame 20 relative to the main frame 10, the following mechanism is provided. A toothed rack 130 is freely pivoted at 132 to each of the members 126 and each of the racks 130 extends into engagement with a pinion 134 (see Fig. 10) carried by a shaft 136. The shaft 136 extends longitudinally of the frame 10 and is mounted in suitable bearings 138 at each frame member 16 (see Fig. 6). The shaft 136 also carries a gear 140 adjacent the right hand end thereof as viewed in Fig. 6 which, as shown in Fig. 10, meshes with a pinion 142 fixed upon a shaft 144. The shaft 144 is carried by suitable bearings 146 at each of the frame members 16 and terminates at the right hand end of the machine in a square head 148. The square head 148 is adapted to receive a suitable wrench or crank (not shown) which may be actuated to rotate the gear train just described to move the frame 20 relative to the frame 10. A locking pawl 150 is pivoted at 152 in a bracket 154 adjacent the right hand end of the machine and is arranged to enter the teeth of the gear 140 to prevent rotation of the gear train and thus to lock the frame 20 with respect to the frame 10. The pawl 150 is provided with an actuating handle 156 which projects into a convenient position adjacent that in which the crank or wrench is applied in order that the operator may release the pawl 150 at any time it is desired to move the tensioning frame 20.

The tensioning frame 20 is provided with a longitudinal shaft 158 which extends through the frame members 126 from end to end of the machine. A link 160 is attached to each of the carriages 68 and is adapted to rest freely upon the shaft 158 adjacent each of the tensioning frame members 126. Each of the links 160 is provided with a locking projection 162 having a substantially vertical face and an inclined portion 164. Upon relative movement of the carriages 68 and the tensioning frame 20 toward one another from the position shown in Fig. 10, the inclined faces 164 will ride over the shaft 158 and the vertical faces of the locking projections 162 will thereupon lie to the right of shaft 158 as viewed in Fig. 10. In such position of the parts movement of the tensioning frame 20 toward the right will be transmitted through the links 160 to the carriages 68 whereby the fabric tensioning device 24 and the row of pins 36 will move as a unit. The shaft 158 is provided with a plurality of discs 166 positioned adjacent each link 160. Each of the discs 166 carries an eccentric pin 168 so positioned as to engage the associated link 160 upon rotation of the shaft 158. When it is desired to disengage the links 160 from the shaft 158 the latter may be rotated to cause engagement of the eccentric pins 168 with each of the links 160 to elevate the links whereby to disengage the locking projections 162 thereon from the shaft 158. Under such conditions the tensioning frame 20 may be movde independently of the row of pins 36.

As shown in Figs. 4 and 10, a curved table 170 is supported in the zone between the row of pins 36 and the fabric gripping device 24. This table 170 may comprise a fiber board top 172 and suitable frame 174 which is attached at one end to the carriages 68 in any suitable manner. Along the other edge the table 170 may be supported by rollers 176 resting upon the members 126.

When a piece of fabric constructed in accordance with the description in this section of the specification is to be positioned upon the machine, the following procedure may be carried out. Particular reference in this connection may be had to Fig. 7. The fabric is normally folded or rolled in such manner that both of the extreme end edges are readily available. The movable set of pins 36 is adjusted so that the spacing between these pins and the fixed pins 54 is slightly greater than the length of the unwoven warp ends 42 and 46. The end edge 50 which is to occupy the lowermost position on the machine is first laid across the machine. The inflatable tubes will have been removed from the fabric gripping devices 22 and 24 and the links 160 will be hooked to the shaft 158 on the tensioning frame 120 so that the tensioning frame and the row of pins 36 will move as a unit. The end edge 50 is then carefully placed upon the pins 54 and 36 with the unwoven warp ends 46 disposed in parallel relationship and square with the lines established by the rows of pins 36 and 54. The spacing bar 38 and spacing rod 56 are then laid on the fabric adjacent the pins 36 and 54 in the position shown in Fig. 7. The other extreme end edge portion 48 of the fabric 30 is then placed upon the pins 54 and the woven portion of the main body of the fabric is placed upon the pins 36 and in this operation care is exerted to see that corresponding warp ends 42 and 46 are positioned in vertical alignment with one another. The regularly spaced colored portions 58, 60 and 62 are availed of to facilitate this operation. Thereafter the inflatable tube 108 is inserted in the stationary fabric gripping device 22 and is inflated when the operator is satisfied that the extreme end portions 48 and 50 are properly and evenly positioned within the trough members 88 and 90. The tensioning frame 20 is then moved by operation of the apparatus described in connection with Fig. 10 to draw the carriages 68 and the pins 36 carried thereby in a direction to apply tension to the portion of the fabric stretched between the pins 36 and the stationary pins 54. When the operator is satisfied that vertical registry of corresponding warp ends has been established, both thicknesses of the fabric are placed within the trough 114 of the fabric gripping device 24 and the inflatable tube 118 is inserted. The fabric is carefully smoothed throughout the width of the machine and the tube 118 is inflated. The shaft 158 is then rotated to release the links 160. The locking pawls 74 for the carriages 68 and the locking pawl 150 for the tensioning frame driving mechanism are released. The shaft 144 is then rotated to move the tensioning frame 20 toward the right as viewed in Fig. 10 during which operation the entire length of fabric extending from the fixed pins 54 to the gripping device 24 may be placed under a desired degree of tension. During this operation the row of pins 36 will float, i. e., move freely relative to the frame 10 so that even tension is applied on either side thereof. When suitable tension is established, the locking pawl 150 is reset and the locking pawls 74 are also reset. The fabric is now positioned for operation of the yarn tying carriage.

*Yarn tying carriage*

Referring to Figs. 1, 4 and 6, the yarn tying carriage 26 is shown in an intermediate position such as it would assume after performing a portion of its operative excursion. The starting position for the yarn tying carriage 26 will be toward the right hand end of the machine as viewed in Fig. 1 so that the elements thereof will clear the right hand edge of the fabric 30 positioned in the machine. The yarn tying carriage 26 includes a housing 178 supported on spaced arms 180, 182 which extend horizontally, as shown in Fig. 4, to position the housing 178 above the portion of the fabric 30 wherein the unwoven warp ends are stretched in vertical alignment. The arms 180 and 182 are bent downwardly into a generally vertical plane and toward one another to support at their lower ends a roller 184 which is adapted to bear against the vertical inner surface of an angle 186 which extends horizontally of the full length of the machine. Opposite the roller 184 is mounted an insulated post 185 which serves to limit accidental disengagement of the roller 184 from the angle 186. The arms 180 and 182 also carry a bracket 188 on which is mounted a pair of flanged rollers 190, 192, which bear upon the upper edge of an angle 194 which extends longitudinally of the full width of the machine. From the construction thus generally described it will be apparent that the weight of the yarn tying carriage 26 rests upon the angle 194 and the moment resulting from the tendency of the structure to rock about the angle 194 causes the roller 184 to be pressed firmly against the lower angle 186. The angles 194 and 186 thus serve as tracks along which the yarn tying carriage 26 may be freely moved and from which it may be removed by a simple lifting and twisting motion as will be apparent from a consideration of Fig. 4.

The structure just described is shown in detail in Fig. 14. In said figure it will be apparent that the angle 188 which supports the upper flanged rollers 190, 192, also carries a bracket 196 on which is supported an electric clutch 198 and a sprocket wheel 200. The sprocket wheel 200 engages the upper flight of an endless conveyor chain 202 (see Fig. 1) which extends longitudinally of the full length of the machine. The sprocket chain 202 is supported at the left hand end of the machine by an idler sprocket 204 and at the right hand end of the machine by a driven sprocket 206. Intermediate idler sprockets 208, one of which is shown in Fig. 1, may be provided to support the lower flight of the chain 208 and any one or more of the sprockets just described may be adjustable for maintaining a suitable tension upon the chain 202. The chain 202 is arranged to be constantly driven by a motor 210 through a speed reducing train which includes a relatively small sprocket or pulley 212 on the shaft of the motor and a chain or belt 214 which drives a relatively large diameter sprocket or pulley 216. The sprocket or pulley 216 in turn drives a speed change mechanism 218 suitably mounted on the frame of the machine. The low speed output shaft 220 of the speed change mechanism 218 carries a sprocket or pulley 222 which drives a chain or belt 224. The chain or belt 224 (see Fig. 4) drives a pulley or sprocket on the sub shaft 226 which carries a driving sprocket 206 for the chain 202. Preferably the speed changing mechanism 218 is of the type which affords a range of speed adjustment and to this end is provided with an adjustment lever 228.

Since the chain 202 is driven constantly during operation of the machine, the yarn tying carriage 26 may be moved along the tracks constituted by the angles 186 and 194 at the speed of the chain or may remain stationary as desired by operation of the clutch 198 (see Fig. 14). The clutch 198 is shown in detail in Fig. 24 and while it may be a conventional electric clutch it is used herein as a brake since when the clutch elements thereof are engaged, the sprocket 200 is locked against rotation and when the clutch elements are disengaged, the sprocket 200 is free to turn. When free to turn the sprocket 200 merely idles with the chain 202 but when the clutch elements are engaged, the sprocket 200 is held against rotation whereby to transmit motion of the chain to the yarn tying carriage 26. While any suitable form of clutch or brake may be used, the one shown in Fig. 24 is an electrically operated clutch comprising a body 230 having a winding 232 therein. The body 230 is fixed upon the bracket 196. A bearing stud 234 projects from the body 230 and carries for rotation relative thereto a clutch element 236 of ferrous metal, a friction disk 238 and the sprocket 200 which is doweled to the clutch element 236 by pins 240 upon which the clutch element 236 is free to move inwardly and outwardly in response to the magnetic flux in the winding 232. When the winding 232 is energized the clutch element 236 and friction disk 238 will be attracted into close frictional contact with the body 230 whereupon the sprocket 200 will be caused to stop rotation. Upon deenergization of the winding 232 frictional engagement will be relieved and the sprocket 200 will be free to rotate upon the bearing stud 234.

The yarn tying carriage 26 is shown with cover removed in Fig. 13. In said figure it will be observed that the carriage includes a platform 242 which is hinged at 244 and 246 to the ends of arms 180 and 182, and is provided as shown in Fig. 13 with a thumb screw 243 to lock it to the arm 180 while in operation, to assure proper engagement with the yarns. In operative position the platform 242 lies horizontally as illustrated in Fig. 13. The hinges 244 and 246 are provided for the purpose of swinging the platform into a generally vertical position (not shown) wherein access is provided to the mechanism beneath the platform 242.

The platform 242 carries a small motor 248 having a pulley 250 of relatively small diameter which drives a belt 252 and a pulley 254 of relatively large diameter mounted upon a shaft 256. The shaft 256 carries a worm gear 258 (see Fig. 25) which meshes with a worm wheel 260 freely rotatable upon a cam shaft 262 mounted in suitable bearings 264 and 266. Referring briefly to Fig. 15, it will be observed that the bearing 264 also carries bearings 268 for the shaft 256. Referring back to Fig. 13, it will be observed that the bearings 268 are positioned at opposite ends of the worm gear 258. The cam shaft 262 is thus driven by the motor 248 at a relatively slow speed.

A single revolution clutch 270 is arranged between the worm wheel 260 and the cam shaft 262 for the purpose of imparting a single revolution to the cam shaft for each complete cycle of operation of the yarn tying device although the motor 248 and gear train including the worm wheel 260 may run constantly. The single revolution clutch is shown in detail in Figs. 26, 27 and 28. The single revolution clutch 270 includes a body 272 secured for rotation with the cam shaft 262 by means such as a set screw 274. The body 272 is provided with an annular groove 276 and a recess 278 which is drilled transversely of the annular groove 276 to receive a clutch element 280 and an expansive spring 282. The clutch element 280 includes a cylindrical nose 284 which is urged by the spring 282 to enter any one of a series of recesses 286 arranged circumferentially of a hub 288 forming a part of the worm wheel 260. The clutch element 280 as seen particularly in Figs. 26 and 27 has formed therein a slot 290 with an angularly disposed wall 292 which serves as a cam surface for cooperation with a declutching lever 294 adapted to enter the annular groove 276. The declutching lever 294, as shown in Fig. 28, is pivoted at 296 upon a fixed bracket 298 supported on the platform 242. An expansive spring 300 is arranged to urge the lever 294 to swing counter-clockwise as viewed in Fig. 28, thus to position the free end of the lever 294 in the annular groove 276 in the clutch body 272. The free end of the lever 294 is provided with a cam surface 302 which terminates in a knife edge adapted to enter the relatively narrow space provided between the wall of the annular groove 276 and the inclined wall 292 of slot 290 in the clutch element 280. Thus when the lever 294 is positioned as shown in Figs. 27 and 28, continued rotation of the clutch body 272 will bring the cam faces 292 and 302 into engagement whereby to withdraw the nose 284 from the engaged recess 286 in the worm wheel 260. A vertically disposed link 304 (see Fig. 28) is pivotally attached to the lever 294 and a vertical downward pull on the link 304 will swing the lever 294 counter-clockwise whereupon the clutch element 280 is moved by spring 282 into engagement with the worm wheel 260 as described above.

In Fig. 25 it will be observed that the link 304 is connected with an armature 306 of a solenoid 308 mounted on the platform 242. The armature 306 is also provided with a downward extension 310 which projects through the platform 242 to engage a blade 312 of an electrical switch. The blade 312 is provided with an electrical contact which engages a similar contact on a blade 314. The blades 312 and 314 are carried in a block 316 of insulating material secured to the under side of the platform 242. The blade 312 is a spring blade tending normally to move upwardly toward closed position as shown in Fig. 25. Such closed position is assumed when the declutching lever 294 is moved by spring 300 to declutching position. The solenoid 308 may be energized by the closing of another switch to be described whereupon the armature 306 will be drawn downwardly to swing the declutching lever out of the annular groove 276 to initiate a cycle of operation of the cam shaft 262. After a predetermined downward stroke of the armature 306 the blades 312, 314 will be opened. As will be more fully explained hereinbelow, the opening of the switch 312, 314 is effective to deenergize the winding 232 of the clutch 198 and thus to cause the yarn tying carriage 26 to cease travel longitudinally of the machine.

Referring first briefly to Fig. 6, the yarn tying carriage 26 is provided with a yarn locating device indicated generally at 318. The yarn locating device projects from beneath the carriage 26 in the direction in which the carriage moves longitudinally of the machine and in its operative excursion. Referring now to Fig. 25, the yarn locating device 318 includes an upper locator 320 and a lower locator 322. These locators are mounted in fixed positions below the platform 242 and lie in vertical planes such that they will respectively engage the upper and lower unwoven warp ends 42 and 46. Referring now to Figure 37, it will be observed that the lower locator 322 is carried on a bracket 324 secured to platform 242. The upper locator 320 is carried on a bracket 326. In Fig. 23, which is a bottom plan view of the carriage 26, it will be observed that the bracket 326 is L-shaped and is secured to the under portion of the platform 242 by a suitable clamp 328. Referring back to Fig. 37, it will be understood that the locators 320 and 322 are thus rigidly mounted in such fashion that the vertically spaced unwoven warp ends may ride upwardly over the tapered nose portions of the locators and thus be placed in specific horizontal planes established by the upper horizontal surfaces of the locators. As shown in said Fig. 37, the upper unwoven warp end 42 is riding toward the upper surface of the locator 320 while the lower unwoven warp end 46 is similarly riding toward the upper horizontal surface of the lower locator 322.

A yarn selector generally indicated in Fig. 25 at the reference numeral 330 is so positioned with respect to the definite positions assumed by the unwoven warps engaged by the yarn locator 318 as to be brought into contact with said yarns upon continued movement of the carriage 26 toward the right as viewed in Fig. 25. (The relationship of the parts just described is shown in detail in Fig. 42.) The yarn selector 330 is mounted on the mechanism shown in Fig. 31 which includes an L-shaped arm 332 to which the selector 330 is freely pivoted, as will be more fully disclosed hereinbelow. The arm 332 is pivoted at its upper end to a selector bar 334. The bar 334 carries a bracket 336 having therein a threaded aperture to receive a screw 338. At its inner end the screw 338 is provided with a swivel fitting connected with one end of a tension spring 340, the other end of which is connected with the L-shaped lever 332. The spring 340 is availed of to urge the arm 332 and the selector 330 carried thereby to swing toward the right as viewed in Fig. 31 and the force exerted by the spring 340 may be accurately adjusted by means of the screw 338. The bar 334 carries a downwardly extending bracket 342 having a horizontally extending portion 344 in which is formed a slot 346 to receive and guide the arm 332. The open end of slot 346 is threaded to receive a screw 348 which may be adjusted longitudinally of the slot to accurately determine the position into which the lever 332 is urged by the spring 340. The bracket 342 also carries a normally open electrical switch indicated generally at 350. The lever 332 is provided with a striker 352 made of insulating material which is arranged to close the switch 350 upon swinging of the lever 332 toward the left, as viewed in Fig. 31. Thus, as the carriage 26 moves toward the right and the locator 318 engages a pair of vertically aligned corresponding warp ends 42 and 46, the selector 330 will be brought into engagement with the located yarns and continued movement of the carriage 26 will normally cause relative movement between the lever 332 and the bracket 342 whereupon the switch 350 will be closed.

Referring now to Figs. 41 and 42, it will be observed that the yarn selector comprises a generally vertically extending body which is freely pivoted upon the end of the lever 332. For this purpose the body of the selector 330 is provided with an opening 352 which freely receives the end of the lever 332. A shouldered screw 354 projects from one side through the body and a suitable aperture in the extreme end of the lever 332 and is threadably engaged in an opening 356 in the other side of the body. The smooth shouldered portion of the screw 354 thus serves as a bearing about which the body 330 may freely and accurately pivot. The axis of the pivot just described is located in a horizontal plane which lies between the planes of the upper and lower unwoven warp ends 42 and 46. Thus, if the selector 330 is brought into engagement with two perfectly vertically aligned warp ends 42 and 46 pressure will be exerted upon the upper and lower end portions, respectively, of the selector 330 and will be transmitted through the arm 332 to close the switch 350 as described above. If the yarns are somewhat less than perfectly vertically aligned the selector will engage one ahead of the other and continued movement of the carriage will be effective to swing the selector 330 about its pivot until the other warp end is engaged. Thereupon when substantially equal pressure is applied by the two warp yarns the lever 332 will be moved to close the switch 350. In this manner it is assured that the switch 350 will not be closed until two yarns have been engaged by the selector 330.

The selector 330 is provided with an upper yarn engaging hook 358 and a lower yarn engaging hook 360 so positioned thereon as to lie beneath the respective warp ends 42 and 46 which are engaged by the selector 330. Preferably the hooks 358 and 360 are carried on cylindrical bodies 362 and 364, respectively, which enter suitable recesses in the body of the selector 330 and which may be secured in appropriate adjusted position by set screws 366 and 368, respectively.

The bar 334 which carries the selector 330 is mounted on the carriage 26 for pivotal movement whereby the selector 330 may be raised and lowered. It also is mounted for longitudinal movement whereby the selector 330 may be moved bodily in directions generally parallel with the planes of the upper and lower unwoven warp ends 42 and 46. Thus referring to Figs. 25 and 31, it will be seen that the bar 334 is pivoted toward its rear end at 370 to an arm 372 of an L-shaped lever, the other arm 374 of which is rigidly secured to a cam lever 376 provided with an aperture 378 (Fig. 31) to receive a pivot pin 380 (Fig. 25) carried in a bracket 382 secured to the platform 242. As shown most clearly in Fig. 31, the arm 334 extends through a slotted fitting 382 fixed to the lower end of a rod 384. The open end of the fitting 382 is closed by a roller 385 rotatable about a pin 386. Vertical movement of the rod 384 will be effective to swing the selector bar 334 about the pivot 370. Rocking movement of the cam lever 376 will be effective through the lever 372, 374 to impart longitudinal movement to the bar 334 which may roll freely on the upper surface of the roller 385. The bar 334 is constantly urged toward the right in Fig. 25 by a spring 335.

Referring now to Fig. 15 which is a vertical section looking toward the left of the apparatus shown in Figs. 25 and 31, the rod 384 extends through the platform 242 and carries at its upper end a roller cam follower 388 which is pressed by an expansive spring 390 upwardly into engagement with a cam 392 fixed upon the cam shaft 262. The cam 392 is shown in elevation in Fig. 19 and it is contoured to impart desired vertical movement to the rod 384 which in turn will produce desired rocking of the selector bar 334 about the pivot 370.

The cam lever 376 (Fig. 31) is provided with a roller cam follower 394 which bears against the surface of a cam 396 as shown in Fig. 15. The cam 396 is shown in elevation in Fig. 20 and is fixed to the cam shaft 262. The cam 396 is so shaped as to impart desired lengthwise movement to the selector bar 334.

Referring back to Fig. 31, the selector bar 334 carries at its extreme rear end a post 398 which threadably receives a screw 400 having an electrical contact 402 on the inner end thereof. The screw 400 may be adjusted to vary the position in space of the electrical contact 402. The contact 402, through the post 398 and selector bar 334, is connected electrically with the frame of the machine and its function will be described hereinbelow.

A yarn holder indicated generally at 404 as shown in Fig. 23 comprises a rectangular frame made up of two bars 406 and 408 pivoted on a shaft 410 supported by two spaced brackets 412 and 414 extending downwardly from the platform 242. The rectangular frame is made rigid by cross bars 416 and 418. The bar 408 as seen in Fig. 23 is provided with an enlarged portion 420 which lies beneath a roller 422. Referring now to Fig. 15, the roller 422 is carried by the lower end of a rod 424 projecting through a bushing 426 in the platform 242 and carrying at its upper end a roller cam follower 428 which bears against a cam 430 fixed upon the cam shaft 262. The cam 430 is shown in elevation in Fig. 17 and it is shaped to impart desired vertical motion to the rod 424 and thus to impart desired rocking motion to the yarn holder frame 404 about the pivot shaft 410. The frame 404 is constantly urged to swing upwardly and thus to maintain the cam follower roller 428 in contact with the cam 430 by means of a spring 415 which is attached at one end to the cross bar 416 (see Fig. 25) and at the other end to a suitable fixture on the lower surface of the platform 242.

The yarn holder 404 is shown in detail in Fig. 32. In general the yarn holder 404 provides two parallel V-shaped grooves into which a pair of selected yarns may be guided by the selector 330 in order that the selected yarns may lie parallel and in the same horizontal plane for operation of the tying mechanism to be described. Thus the forward end of the arm 406 has formed thereon a portion 432 in which is formed a V-shaped groove 434 having an inclined wall 436 of substantial extent and another relatively low inclined wall (not numbered) which intersects a similar relatively low inclined wall on a groove 438. The groove 438 is substantially identical in shape to the groove 434 but constitutes a mirror image thereof. The forward end of the arm 408 has formed thereon a portion 440 having grooves 442 and 444 substantially identical with the grooves 434 and 438 just described. However, the portion 440 has an opening 446 formed therein (see Fig. 49). Such opening intersects the grooves 442 and 444 and is provided to accommodate parts which will be described.

A vertically reciprocable needle 448 (see Fig. 25) is carried on a needle bar 450 which is mounted for vertical reciprocation in suitable bearings in a bracket 452 secured on the upper surface of the platform 242. The needle bar 450 is actuated by an arm 454 pivoted at 456 in a suitable bracket 458 secured to the platform 242. Referring now to Fig. 15, the needle bar actuating lever 454 carries a laterally projecting roller cam follower 460 adapted to bear against the surface of a cam 462 fixed upon the cam shaft 262. As shown in Fig. 25, the needle bar 450 is constantly urged upwardly by a spring 455 bearing against the lever 454. The cam 462 is shown in elevation in Fig. 18 and it is shaped in such manner as to move the needle 448 downwardly and permit it to be raised by spring 455 in each rotation of the cam shaft 262. Referring now to Fig. 23, it will be observed that the path of the needle 448 extends generally centrally through the opening 446 in the portion 440 of the yarn holder 404.

Referring to Figs. 32 and 33, a fork 464 is provided with a cylindrical body 466 which projects from the portion 440 of the yarn holder through the cross bar 418. A collar 468 is secured by a set screw 470 to the cylindrical body 466 to establish the limit of movement of the fork 464 toward the right as viewed in Fig. 33. An expansive spring 472 positioned between the collar 468 and the cross bar 418 tends constantly to urge the fork toward the right and into its limit position as shown in Fig. 33. Mechanism is provided for moving the fork 464 toward the left at a suitable point in the cycle of operation of the machine. Thus a collar 474 is secured to the cylindrical body 466 by a set screw 476 and a slidable collar 478 is positioned upon the cylindrical body for enagement by the lower slotted end of a bell crank lever 480. An expansive spring 482 is arranged between the collars 474 and 478 whereby motion imparted to the bifurcated hook by the bell crank lever 480 is delivered through the expansive spring 482 thus affording a yieldable connection to avoid damage to the machine. As shown in Fig. 32, the bell crank lever 480 is pivoted upon a suitable vertical extension 484 formed on the bar 408. A generally horizontally extending arm 486 of the bell crank 480 is arranged to engage an adjustably fixed abutment 488. As shown in Fig. 25, the adjustable abutment 488 is threadably received in the platform 242 and may be secured in adjusted position by a locknut 490. When the yarn holding frame 404 is swung upwardly in response to rotation of the cam 430 the horizontally extending arm 486 of bell crank 480 will strike abutment 488 rocking the bell crank 480 clockwise and thus yieldably moving the fork 464 toward the left as viewed in Fig. 33. As shown in Fig. 52 the fork 464 has two tines 465 with upturned ends and the fork is so positioned that the needle 448 may be projected downwardly between the tines 465.

A yarn depressor is provided for moving each pair of yarns downwardly and away from the carriage mechanism after they have been tied and cut. The depressor is indicated generally by the reference numeral 491 and is shown in Figs. 25 and 29. The yarn depressor 491 consists of a bar 492 having a recess 493 formed in the lower surface thereof in a suitable position with respect to the parts hereinabove described for engaging the yarns and positively depressing them. The bar 492 is provided with an aperture 494 which receives the outer end of the pivot shaft 410 carried in the brackets 412 and 414 and is integrally connected with a cross bar 496 and a forwardly extending bar 498. The bar 498 is provided with an aperture 500 for pivotal connection with the opposite end of the shaft 410 adjacent the bracket 412. The arm 498 is constantly urged upwardly by a tension spring 502 into engagement with a roller 504 carried at the lower end of a rod 506. Referring now to Fig. 15, the rod 506 extends through a bushing 508 in the platform 242 and carries at its upper end a roller cam follower 510 which bears against a cam 512 fixed upon the cam shaft 262. The cam 512 is shown in elevation in Fig. 21 and it is so shaped as to raise the depressor 491 early in the cycle of operation and to lower it toward the end of the cycle of operation, as will be described hereinbelow.

A knife is provided for cutting each pair of corresponding warp ends free from the extreme end portions 48 and 50 of the fabric at a suitable point in the cycle of operation. As shown in Fig. 30, the knife includes a blade 514 carried on a knife arm 516 having a pivot aperture 518. As shown in Fig. 23, the knife arm 516 may be pivoted to a suitable bracket 520 secured on the under side of the platform 242. The knife arm 516 is constantly urged upwardly by a spring 522 the upper end of which is secured, by means not shown, to the under side of the platform 242. A roller 524 is arranged to bear upon the upper surface of the knife arm 516. Referring now to Fig. 15, the roller 524 is carried at the lower end of a rod 526 which extends through a bushing 528 in the platform 242 and carries at its upper end a roller cam follower 530 which bears against a cam 532 fixed to the cam shaft 262. The cam 532 is shown in elevation in Fig. 22 and is so shaped as to impart an operative stroke to the knife blade 514 at an appropriate time in the cycle of operation.

A yarn gripper is provided for individually gripping the selected warp ends in the V-shaped grooves formed in the portion 432 of the yarn holder 404 upon upward movement of the yarn holder at an appropriate time within the cycle of operation. The yarn gripper is referred to herein generally by the reference numeral 534 and the location thereof is indicated in Fig. 23 wherein it is shown in dotted lines. The yarn gripper is shown in detail in Figs. 34, 35 and 36. It includes a cylindrical body 536 having a threaded upper end adapted to be received in the platform 242 and secured in position by a locknut 538. An upper collar 540 and a lower collar 544 are secured to the cylindrical body 536 and an expansive spring 542 surrounds the body and is confined between said collars. At its lower end the body 536 has formed thereon a fixed gripping jaw 546 which may have a serrated working edge and which is so shaped as to fit within the V-shaped groove 438 in the yarn holder 404. A movable jaw 548 having similar serrations is shaped to fit in the V-shaped groove 434 of the yarn holder 404. The movable jaw 548 is arranged to slide vertically within a slot 550 formed in the body 536. As shown in Fig. 35, the movable jaw 548 is formed with ears 552 which project outwardly of the body 536 and into engagement with the lower end of the expansive spring 542. Thus the movable jaw 548 is yieldably urged downwardly into the position shown in Figs. 34 through 36. The extreme downward position of the movable jaw is limited by the lower fixed collar 544. It will be apparent that when the yarn holder 404 moves upwardly into engagement with the yarn gripper the movable jaw 548 will first engage a yarn in the groove 434 and continued upward movement will eventually bring the fixed jaw 546 into engagement with a yarn in the groove 438. Conversely, upon downward movement of the yarn holder 404 the yarn lying in the groove 438 will be first released and the yarn lying in the groove 434 will remain gripped until the yarn holder is lowered still further.

The needle 448 is shown in detail in Figs. 38 and 39. It comprises the usual cylindrical body with a pointed end 553 and has formed therein a hook 554 having an entrance wall 556 inclined inwardly of the body of the needle and away from the point 553. The hook is of such dimensions as to receive one of the warp ends to be handled. Obviously needles having appropriate diameters and hook dimensions may be used for yarns of various weights. The needle 448 is also provided with a guard 558 pivoted at 560 between the point 553 and the hook 554 The needle 448 is provided with a groove 562 (see Figs. 53 and 54) extending above and below the pivot 560 in which the guard 558 may seat. Fig. 53 shows the guard 558 in an open position corresponding with the dotted line position in Fig. 38 while Fig. 54 shows the guard in a position corresponding with the full line showing in Fig. 38 wherein it closes the entrance to the hook 554.

In Fig. 25 there is shown a blade spring 564 secured at its upper end to the frame of the carriage 26 and curved inwardly toward its lower end so as to bear against the needle 448. Referring now to Fig. 52, it will be observed that the spring blade 564 is so positioned as to hold the guard 558 in its open position as the needle 448 moves downwardly. The guard 558 is so constructed as normally to remain open under the influence of gravity but it will be understood that a rapid change of direction of movement of the needle from upwards to downwards at the top of the stroke may tend to swing the guard toward closed position. The spring blade 564 prevents such occurrence and insures that the needle will approach the warp end to be pierced thereby with the guard 558 in open position.

An electrical stop motion is provided to halt operation of the yarn tying mechanism in the event warp ends are not properly engaged by the needle 448 and hook 544. To this end, as shown in Fig. 25, a feeler 564 is pivoted upon a shouldered screw 566 (see Fig. 32) carried by the yarn holder frame 404. As shown in Fig. 23, the feeler 564 includes a flexible metallic blade 568 arranged for contact with the body of the needle 448 upon pivotal motion of the feeler 564 in a horizontal plane. The feeler 564 includes a body 570 which pivots upon the shoulder screw 566 and which has formed therein a slot 572 which receives a lever 574. The lever 574 is constantly urged to rotate in a clockwise direction as viewed in Fig. 23 by a torsion spring 576. Referring back to Fig. 25, the lever 574 projects upwardly through the platform 242 and through the bearing 268. At its upper end the lever 574 carries a lever 578 having a roller 580 on its free end. Referring now to Fig. 13, the lever 578 and roller 580 are so positioned as to lie in the path of an arm 582 fixed in a hub 584 secured upon the cam shaft 262. The arm 582 and hub 584 are shown in elevation in Fig. 16. Upon each revolution of the cam shaft 252 the arm 582 will strike the roller 580 whereby to turn the lever 574 clockwise as viewed in Fig. 13 or counter-clockwise as viewed in Fig. 23. Upon such movement the blade 568 is swung to engage the body of the needle 448. If a yarn is properly positioned on the needle as shown in Fig. 56, the blade 568 will engage the yarn carried in the hook 544 and no electrical contact will be made. If no yarn is caught in the hook 544 electrical contact will be made between the blade 568 and the body of the needle 448. The needle 448 is electrically connected with the frame of the carriage 26.

Electrical circuit

Referring first to Fig. 1, no circuit connections have been shown for the motor 210 which drives the carriage driving chain 202 inasmuch as a simple on-off switch of any suitable design may be provided for energizing the motor when desired. As pointed out above, the sprocket chain 202 ordinarily will be driven constantly throughout any period of operation of the machine.

It is preferred to operate the electrical equipment in the yarn tying carriage 26 at a low voltage and with direct current although it will be understood that such preference is dictated entirely by practical considerations. Thus there is illustrated a step-down transformer 586 and a rectifier 588 mounted upon a leg 12 of the frame. One side of the output of the rectifier 588 is connected directly to the frame 10 and the other is connected with the lower track rail 186. The lower track rail 186 is supported upon a longitudinal frame member 14 by means including insulating washers 590 to isolate the rail 186 from the remainder of the frame. Referring now to Fig. 14, the roller 184 is in electrical contact with the track 186 and with a threaded stud 592 which passes through an insulated bushing 594 in the carriage frame.

A wire 596 is connected with the stud 592 through which current may be conducted from the track 186 to the carriage 26. Referring now to Fig. 40, the wire 596 is connected through a wire 598 with a lamp 600, the other side of which is connected through a wire 602 with the frame of the carriage 26, and serves to illuminate the mechanism below the platform 242 to observe its proper operation with the warp yarns 42 and 46. The lamp 600 thus will light whenever current is being supplied through the circuit just described to the carriage 26.

The wire 596 is also connected through a wire 604 with the central contact member 606 of a single pole double throw magnetic switch of the reset type. In the position of the parts illustrated in Fig. 40, the contact member 606 is connected with a contact member 608 from which current is supplied to operative parts of the carriage 26. The contact member 606 is held in this position by a latch 610 constantly urged toward the full line position shown in Fig. 40. An electro-magnet 612 is so positioned with respect to the latch 610 as to pull the latch to dotted line position upon energization of the electromagnet 610. When the latch 610 is moved into the dotted line position the central contact member 606, which is constantly urged toward the contact member 611, will make contact with the member 611 and through the wire 614 will light the indicator lamp 616. A reset button 618 of any conventional construction is provided for reengaging the central contact 606 with the contact member 608 whereby to extinguish the indicator lamp 616 and to supply current to the mechanism of the carriage. The resettable magnetic switch just described includes a winding 620 which is placed in series with the feeler 564 of the electrical stop motion and with the contact 608. Thus when the parts are in the position illustrated in Fig. 40, electrical contact between the feeler 564 and the needle 448 will energize the electro-magnet 612 thereby cutting off current supplied to the operative parts of the carriage 26. As explained above, such action occurs at a predetermined point in the cycle of operation only in the event yarn is not properly positioned in the hook 544 of the needle 448. In such event the cycle of operation is halted at this point and the indicator lamp 616 will signal to the operator that the tying operation has not been properly carried out. The position of the reset button 618 and indicator lamp 616 on the carriage 26 is shown in Fig. 13 and the position of the electro-magnet 612 is shown in Fig. 23.

With the parts in the position illustrated in Fig. 40, current is delivered from the contact member 608 to a line 622 connected with manually operable switches 624, 626 and 628, the locations of which are shown in Fig. 13. When the switch 624 is closed a circuit is established through the winding 232 of the sprocket clutch 198 which controls carriage travel and through the switch 312, 314 to a contact 630. The contact 630 is so positioned as to establish electrical connection with the contact 402 on the extreme end of the selector bar 334 only when said selector bar is in its extreme right hand position as illustrated in Fig. 25. Since, as described above, the selector bar 334 is moved longitudinally by a cam on the cam shaft 262, it will be understood that the contacts 402 and 630 will be closed only at some particular point within the cycle of operation of the carriage. The timing will be explained herebelow, but for the present it will be understood that whenever the contacts 402 and 630 as well as the contacts 314 and 312 are closed the winding 232 of the clutch 198 will be energized whereby the carriage 26 may move with the drive chain 202. An indicator lamp 632 may be connected with the switch 624 and the frame of the carriage to indicate that the carriage traveling mechanism is turned on.

When the switch 626 is closed, a circuit is established to the winding of the solenoid 308 which controls the clutch 270 for the cam shaft 262. Thus a wire 634 is connected with one end of the winding of the solenoid 308 and a wire 636 is connected with the opposite end of the winding and with the switch 350 which is opened and closed as described above in response to movement of the yarn selector 330. The circuit is completed to the frame of the carriage 26 through a wire 638 and a condenser 640 may be provided to suppress sparking of the contacts of switch 350.

When the switch 628 is closed, a circuit is completed through the motor 248 and the frame of the carriage whereby the motor 248 is energized.

The switches 624, 626 and 628 just described might be differently arranged or ganged if so desired. The particular arrangement herein described is preferable since it permits separate energization of the various principal elements of the machine which is useful in making adjustments, testing, etc.

Operation

The operation of many of the parts of the machine has been described in conjunction with the description of the parts and accordingly, the following detailed description of overall operation will be limited to timing and to those parts whose operation has not yet been set forth. Also, certain parts which have been provided to facilitate operation upon the warp ends after they have been tied have not yet been described and will be described in a subsequent section of this specification.

Assuming that a fabric 30 has been positioned in the machine as described hereinabove with the unwoven portions of the warp ends in vertical alignment, the carriage 26 will be positioned on the machine at the extreme right hand end thereof as viewed in Figs. 1 and 6. In this initial position the yarn locators 318 will be spaced toward the right away from the first pair of aligned warp ends 46, 42. The motor 210 will be started to initiate continuous operation of the carriage drive chain 202. The switches 624, 626 and 628 on the carriage 26 will be closed and with the parts in the positions illustrated in wiring diagram 40, which correspond with the position of the cam shaft 262 as shown in Figs. 13, 15 and 25, the sprocket clutch 198 will immediately be energized to initiate travel of the carriage 26 toward the first pair of warp ends 42, 46. The yarn locator 318 will engage the first pair of warp ends 42, 46 and they will ride on to the locator blades 320, 322 as shown in Fig. 37. Continued movement of the carriage 26 will bring the yarn selector 330 through the position shown in Fig. 42 into that shown in Fig. 43 wherein pressure is exerted on the upper and lower ends, respectively, of the selector 330 and the continued movement of the carriage will cause the arm 332 to swing relatively to the carriage whereby to close the switch 350. From a consideration of the wiring diagram, Fig. 40, it will be apparent that closing of the switch 350 will result in energization of the solenoid 308. The solenoid 308 will open the switch 312, 314 to halt carriage movement. The carriage 26 is held stationary by a friction brake 644 (see Fig. 14). The solenoid 308 also will withdraw the declutching lever 294 from the cam shaft clutch 270 whereupon rotation of the cam shaft 262 is initiated. Such rotation is in a clockwise direction as viewed in Figs. 17 through 22.

Referring to Fig. 19, it will be observed that the cam 392 has an inwardly sloping eccentric portion 393 approaching the follower 388. Thus the follower 388 will commence an upward movement very shortly after initiation of rotation of the cam shaft. Such upward movement of the follower 388 will result in raising of the selector bar 334 whereupon the selector 330 will be moved upwardly relative to the warp ends 42 and 46 so as to engage the hooks 358 and 360, respectively, with said warp ends. Such position is shown in Fig. 45. At the same time the depressor 491 will start to rise rapidly toward the position shown in Fig. 44 inasmuch as the follower 510 which bears against cam 512 (Fig. 21) will encounter the steeply sloped portion 642 of said cam 512. The yarn selector 330 continues its upward movement for a brief additional period and commences a movement toward the right as viewed in Fig. 46, following a resultant path indicated in the dot-dash line 646. Movement toward the right is caused by the cam 396 (see Fig. 20) in which there is a rise 648 which will depress the follower 394. The selected pair of warp ends 42, 46 are thus carried upwardly and away from the next adjacent pair of warp ends 42 and 46 and continued movement of the selector toward the right will bring the lower portion thereof into engagement with an adjustable abutment 650 carried by the bracket 324 fixed to the platform 242 (see Fig. 37). Continued movement of the selector 330 toward the right as viewed in Fig. 47 will tilt the selector 330 into the position illustrated in Fig. 48 wherein the selected warp ends 42 and 46 are offset vertically and thus substantially aligned with the V-shaped grooves provided in the yarn holder 404. At this point in the cycle the yarn holder 404 starts moving upwardly in response to a depression 652 in the cam 430 (see Fig. 17).

In Fig. 49 the yarn holder 404 has been raised sufficiently to lift the warp ends 42 and 46 from the selector 330, which in the meantime has moved slightly toward the left, and to position the warp ends in the V-shaped grooves in the holder 404. Also, the yarn holder has carried the warp ends 42 and 46 successively into gripping relation with the movable jaw 548 and the fixed jaw 546 of the yarn gripper 536. When both yarns have been gripped the knife blade 514 swing downwardly as indicated in Fig. 51 to cut the ends 42 and 46 free from the extreme portions of the fabric 30. Referring back to Fig. 49, it will be observed that the fork 464 has to this point been so positioned that both of the warp ends 42 and 46 will lie above and inside the upturned tines 465. However, as the yarn holder 404 approaches its extreme upper position corresponding with the point 653 on cam 430, the parts shown in Fig. 32 will be effective to draw the fork toward the right as viewed in Fig. 49 to engage the warp end 46 and draw it toward the needle 448.

In the meantime the needle 448 will have been lowered by advancement of the cam 462 (see Fig. 18). In Fig. 52 the needle 448 is about to penetrate the warp end 42, which it will be recalled is the end forming a part of the upper layer of fabric as shown in Fig. 7. The guard 558 is held in open position by the spring blade 564, as shown in Fig. 52. As the needle continues its downward movement and the fork 464 continues its movement toward the right, the point 553 will penetrate the warp end 42 substantially in the longitudinal center line thereof and the warp 46 will be brought by fork 464 into yielding engagement with the needle 448 so as to enter the hook 544 as the needle continues downward movement. As the needle progresses from the position shown in Fig. 53 to that shown in Fig. 54, the pierced warp end 42 will cause the guard 558 to close upon the warp end 46 which is now engaged by the hook 544. At this point in the cycle the yarn holder 404 moves slightly downwardly and releases the warp end 46 from gripping engagement with the fixed jaw 546 of the yarn gripper 536. The warp end 42, however, remains gripped by the movable jaw 548. The cam 430 (see Fig. 17) is so shaped as to include a dwell at 654 to retain the yarn holder 404 against further downward movement for a brief period during which the needle 448 continues its downward stroke to carry a loop of the released warp end 46 through the still gripped warp end 42. The position thus assumed is shown in Fig. 56. In the position of the parts shown in Fig. 56, the feeler blade 568 is moved horizontally by the arm 582 (see Fig. 16) toward the needle 448 and if it engages a properly positioned warp end 46, no electrical contact will be established and the mechanism will continue the cycle. If the operation of the parts has been defective, the warp end 46 will not be properly positioned. The consequent electrical contact between the blade 568 and the needle 448 will bring the cycle to a halt and will light the indicator lamp 616 as described hereinabove.

As the needle 448 moves toward completion of its downward stroke, the guard 558 prevents the pierced warp end 42 from engaging the hook 544. When the parts reach the position shown in Fig. 57, the full length of the warp end 46 has been projected through the body of the warp end 42, the latter remaining gripped by the movable gripper jaw 548 throughout this period. In the meantime the guard 558 has fallen open by gravity and the needle is ready to start its upward movement. At this point the yarn holder moves downwardly releasing the warp end 42 from the gripper jaw 548.

The yarn depressor 491, which it will be recalled moved rapidly upwardly at the beginning of the cycle, has been maintained in an upper position while the follower 510 rides over a concentric portion 656 of the cam 512 (see Fig. 21). However, as the warp end 42 is released from the gripper jaw 548 and the needle 448 starts its upward stroke, the depressor 491 swings downwardly to engage the warp ends 42 and 46 as shown in Fig. 58. When the needle 448 clears the pierced warp end 42, continued downward movement of the depressor 491 will move the tied ends 42 and 46 downwardly through the position shown in Fig. 59. The depressor 491 continues its downward movement through the last 90° of rotation of the cam shaft 262 and when the cycle comes to an end the follower 510 rests on the high point 657 of the cam 512 as shown in Fig. 21. During the last 90° of rotation the yarn gripper 404 remains in lowered position and the needle 448 and knife 514 complete their upward strokes. During said period the selector 330 moves to the initial position illustrated in Fig. 25 due to the sharply inclined portion 649 of the cam 396 (see Fig. 20). The various parts just referred to are thus brought to a position for the next cycle of operation of the carriage 26.

The cam shaft will stop rotation at the completion of the cycle inasmuch as the solenoid 308 has been deenergized by opening of the switch 350 (see Fig. 40) when the warp ends 42 and 46 are carried away from the selector 330 by the yarn holder 404. Deenergization of the solenoid 308 not only permits the declutching lever 294 to move to operative position for this purpose but also closes the contacts 312, 314. However, by the time this point in the cycle has been reached the selector bar 334 has moved longitudinally to open the contacts 402 and 630. When the end of the cycle is approached the return of the selector bar 334 to initial position will close the contacts 402 and 630 and the winding 232 of sprocket clutch 198 will be energized whereby the carriage 26 is set in motion. Thus, the carriage 26 moves toward the next pair of warp ends for the performance of a new cycle of operation. The machine, accordingly will successively "tie" each pair of corresponding warp ends throughout the width of the fabric 30 and completion of such operation ordinarily will be interrupted only by the electrical stop motion in the event of imperfect operation on a particular pair of warp ends.

It has been found advisable to provide means for accurately establishing the position of the cam shaft 262 at the end of each cycle and for holding the shaft against unwanted rotation which might be caused by the pressure of cam followers upon their respective cams. Thus, for example, the cam 430 may be provided with a detent notch 655 shaped to snugly receive the follower 428 at the desired rotational position of the cam shaft 262.

Reference has been made above to the provisions of needles of various sizes for operation upon yarns of different weight. It also is preferable to mount the needle bar 450 for adjustment in a horizontal plane in order that the needle 448 may be accurately centered with respect to the warp end which it is to pierce. As shown in Fig. 13, the bracket 452 for the needle bar 450 is pivoted on a screw 658 in the upper surface of the platform 242. An adjustment screw 660 having an indexed head 662 is threadably received in a lug 664 fixed to the platform 242. The screw 660 is fixed against longitudinal movement but free to rotate in spaced ears 666 and 668 on the bracket 452 whereby rotation of the head 662 will be effective to swing the bracket 452 in a horizontal plane.

Handling of tied warp

From the description hereinabove, it will be apparent that each corresponding pair of warp ends 42 and 46 is successively pushed downwardly from the carriage 26 whereupon they may fall into the position shown in Fig. 60. The "tied" ends rest upon an inclined surface 670 and a horizontal surface 672.

Referring now to Fig. 4, it will be observed that the surfaces 670 and 672 are formed upon a box-like structure 674 which is positioned upon the frame of the machine with the surface 672 lying just below the planes in which the unwoven warp ends 42 and 46 were initially positioned in the machine. The boxlike structure 674, as shown in Fig. 9, is covered with a pile fabric 676 which extends over the surfaces 672 and 670. A second pile fabric 675 is supported on a metal or other suitable backing member 677 secured by screws 679 to the carriages 68 (see Fig. 10). The pile fabric 675 overlaps the pile fabric 676 whereby to prevent a continuous pile covered surface irrespective of positions of adjustment of the carriages 68.

A weighted retainer 678 (see Fig. 9) is pivoted at 680 to the structure 674. During travel of the carriage 26 for "tying" of the corresponding warp ends, the retainer 678 is placed in the full line position shown in Fig. 9. After all of the ends have been tied, the spacer bar 38 is removed and the retainer 678 is swung up into the dotted line position shown in Fig. 9 wherein it exerts yielding pressure against the tied warp ends, pressing them into frictional engagement with the pile fabric 676 on the surface 670. Also if so desired, a relatively thick sheet of transparent plastic material (not shown) may be placed upon those portions of the warp ends which lie upon the pile fabric 676 on the horizontal surface 672. The retainer 678 and the transparent weight, if used, press all of the ends into frictional engagement with the pile fabric 676 and make it possible to withdraw individual pairs of warp ends lengthwise and toward the right, as viewed in Fig. 9, without danger of entanglement of adjacent parts of ends.

Referring now to Fig. 61, it will be apparent that a warp end 42 may be picked up at any desired point within the upper woven portion of the fabric 30 and such end may be drawn to pull the corresponding warp end 46 tied thereto into the fabric 30. Any desired regular pattern of staggering of the points at which the drawing operation takes place throughout the width of the piece may be followed. Thus in Fig. 61, it will be observed that the end 42 has been picked up at an intersection with a filler 66 which (see Figs. 6 and 7) is a filler of contrasting color. Such operation will eventually complete the formation of a splice wherein the last filler yarn, such as 44a in the upper portion 40 of the fabric, will be positioned in close parallel relationship with the last filler yarn of the lower portion 32 of the fabric 30.

Since different types of yarn behave differently in the machine of the present invention, it has been found advisable in some instances to improve the security of the "tie" formed on corresponding warp ends. Referring to Fig. 60, it will be observed that the warp end 46 extends through the warp end 42. It also will be recalled that the warp end 42 extends from the upper portion 40 of the fabric 30 and accordingly when the ends are drawn for completing the splice, tension will be applied to the warp end 42 and obviously there will be much less tendency for the end 46 to slip through the opening in the end 42 than would be the case if tension were to be applied to the end 46. Similarly, when the point of joinder of the two yarns enters the woven portion of the fabric 30, the end 46 will be turned sharply upon itself above and below the point of penetration through the end 42 and thus be reasonably secure against slippage. However, if so desired, any suitable form of stiffening or friction increasing material may be applied to the tied ends when they all lie in the position assumed by the single pair of ends illustrated in Fig. 60. Preferably the material used is one which may be readily removed after it has served its purpose, as for example by washing of the fabric or as an incident to the fulling or shrinking operation frequently carried out on woolen fabrics. The stiffening material may be conveniently applied by spraying the same on the tied ends before the drawing-in operation. A particularly suitable material for this purpose is an acrylic base resin of the type sold in pressurized spray cans under the trade name "Krylon."

Conclusion

From the above detailed description of illustrative specific apparatus, it will be apparent that the present invention provides a machine in which the end edge portions of specially woven fabric may be positioned with corresponding warp ends in vertical alignment. There also is provided means for "tying" the corresponding warp ends preparatory to drawing-in in the formation of a splice. The invention also provides apparatus for facilitating the drawing-in of the "tied" ends without danger of entanglement. The invention also provides a specially woven fabric which may, if desired, include yarns of contrasting color or appearance in the filler for the establishment of a desired pattern for the splice. The detailed disclosure hereinabove is intended to be illustrative rather than limitative inasmuch as modifications and variations in detail will occur to those skilled in the art.

I claim:

1. Apparatus for uniting yarns and the like comprising means for supporting a plurality of pairs of yarns in spaced relationship, means engageable with a selected spaced pair of yarns for placing them in juxtaposed relation, a needle having a point and having a hook adapted to engage and carry a yarn in a direction corresponding with advancement of the point of said needle, and means for advancing and retracting said needle whereby to project the point of said needle through one of said yarns in a direction substantially normal to the longitudinal axis of said one yarn while engaging the other of said yarns in said hook to carry the same through said one yarn and upon retraction of said needle to leave said yarns united.

2. Apparatus for uniting yarns and the like comprising means for supporting a plurality of pairs of yarns in spaced parallel relationship, each yarn being under longitudinal tension and yarns forming each of said pairs being spaced from each other in a generally vertical direction, means engageable with a selected vertically spaced pair of yarns for displacing them from the remaining pairs of yarns and placing them in juxtaposed relation while still under longitudinal tension, a needle having a point and having a hook adapted to engage and carry a yarn in a direction corresponding with advancement of the point of said needle, and means for advancing and retracting said needle whereby to project the point of said needle through one of said yarns in a direction substantially normal to the longitudinal axis of said one yarn while engaging the other of said yarns in said hook to carry the same through said one yarn and upon retraction of said needle to leave said yarns united.

3. Apparatus for uniting yarns and the like comprising means for supporting a plurality of yarns in spaced parallel relationship in a first horizontal plane, means for supporting a plurality of yarns in spaced parallel relationship in a second horizontal plane spaced vertically from said first horizontal plane, each yarn being under longitudinal tension and the yarns in both said horizontal planes being parallel, means movable in a horizontal direction transversely of said yarns and engageable with a pair of yarns consisting of one yarn from each of said horizontal planes for displacing said pair from the remaining pairs of yarns and placing them in juxtaposed relation, a needle having a point and having a hook adapted to engage and carry a yarn in a direction corresponding with advancement of the point of said needle, and means for advancing and retracting said needle whereby to project the point of said needle through one of said engaged yarns in a direction substantially normal to the longitudinal axis of said one yarn while engaging the other of said engaged yarns in said hook to carry the same through said one yarn and upon retraction of said needle to leave said yarns united.

4. Apparatus for uniting yarn and the like comprising means for supporting a plurality of pairs of yarns in spaced parallel relationship, each yarn being under longitudinal tension and yarns forming each of said pairs being spaced from each other in a generally vertical direction, means engageable with a selected vertically spaced pair of yarns for displacing them from the remaining pairs of yarns and placing them in juxtaposed relation while still under longitudinal tension, a needle having a point and having a hook adapted to engage and carry a yarn in a direction corresponding with advancement of the point of said needle, means for advancing said needle whereby to project the point of said needle through one of said yarns in a direction substantially normal to the longitudinal axis of said one yarn and to engage the other of said yarns in said hook to carry said other yarn through the yarn penetrated by said needle, means for releasing the tension on said other yarn to permit the same to be so carried by said hook, and means for retracting said needle to leave said yarns united.

5. Apparatus for uniting yarns and the like comprising means for supporting a plurality of pairs of yarns and holding them extended lengthwise in spaced parallel relationship with the yarns forming each of said pairs spaced from each other in a generally vertical direction, means engageable with a selected vertically spaced pair of yarns for displacing them from the remaining pairs of yarns and placing them in juxtaposed relation, a needle having a point and having a hook adapted to engage and carry a yarn in a direction corresponding with advancement of the point of said needle, means for advancing said needle whereby to project the point of said needle through one of said yarns in a direction substantially normal to the longitudinal axis of said yarn and to engage the other of said yarns in said hook to carry said other yarn through the yarn penetrated by said needle, means for releasing one end of said other yarn to permit the same to be so carried by said hook, and means for retracting said needle to leave said yarns united.

6. Apparatus for uniting yarns and the like comprising means for holding a plurality of pairs of yarns in parallel spaced relation, means for engaging one pair of said yarns and displacing them into juxtaposed relation, and means for inserting one yarn of said selected pair bodily through the other yarn of said selected pair in a direction substantially normal to the longitudinal axis of said second yarn.

7. Apparatus for uniting yarns and the like comprising a frame, means on said frame for holding a plurality of pairs of yarns in parallel spaced relation extending in a predetermined direction, a carriage on said frame, means for moving said carriage upon said frame in a direction normal to said predetermined direction, means carried by said carriage for engaging one pair of said yarns and for rendering said carriage moving means ineffective upon engagement of said pair of yarns, and cyclically operable means carried by said carriage for individually uniting said pairs of yarns, said cyclically operable means including means to displace said engaged pair of yarns into juxtaposed relation, means for inserting one yarn of said selected pair bodily through the other yarn of said selected pair in a direction substantially normal to the longitudinal axis of said second yarn, and means for thereafter rendering said carriage moving means effective to move said yarn engaging means into engagement with another pair of yarns, and said cyclically operable means thereafter being operable upon said another pair of yarns.

8. Apparatus for facilitating the splicing of opposite ends of a length of fabric to form an endless belt therefrom comprising a frame, means for supporting on said frame the opposite ends of a length of fabric in superimposed relation with lengths of unwoven warp yarns extending from each of the ends of said fabric in spaced parallel relation, a carriage movable upon said frame transversely of the length of fabric supported thereon, means for moving said carriage, and cyclically operable means carried by said carriage for uniting each corresponding pair of unwoven warps, said cyclically operable means including means for inserting one yarn of each pair of unwoven warps bodily through the other yarn of said pair in a direction substantially normal to the longitudinal axis of said other yarn.

9. Apparatus for facilitating the splicing of opposite ends of a length of fabric to form an endless belt therefrom comprising a frame, means for supporting on said frame the opposite ends of a length of fabric in superimposed relation with lengths of unwoven warp yarns extending from each of the ends of said fabric in spaced parallel relation, a carriage movable upon said frame transversely of the length of fabric supported thereon, means for moving said carriage, cyclically operable means carried by said carriage for uniting each corresponding pair of unwoven warps, said cyclically operable means including means for engaging a pair of said warps and for rendering said carriage moving means ineffective upon such engagement, and means operative upon completion of the uniting of said pair of warps to render said carriage moving means effective to advance said carriage into engagement with another pair of said warps.

10. Apparatus for facilitating the splicing of opposite ends of a length of fabric to form an endless belt therefrom comprising a frame, means for supporting on said frame the opposite ends of a length of fabric in superimposed relation with lengths of unwoven warp yarns extending from each of the ends of said fabric and the opposite ends of each warp being arranged as a pair in vertically spaced parallel relation, a carriage movable upon said frame transversely of the length of fabric supported thereon, means for moving said carriage, and cyclically operable means carried by said carriage for uniting each pair of unwoven warps, said cyclically operable means including means for inserting one yarn of each pair of unwoven warps bodily through the other yarn of said pair in a direction substantially normal to the longitudinal axis of said other yarn.

11. Apparatus for facilitating the splicing of opposite ends of a length of fabric to form an endless belt therefrom comprising a frame, means for supporting on said frame the opposite ends of a length of fabric in superimposed relation with lengths of unwoven warp yarns extending from each of the ends of said fabric and the opposite ends of each warp being arranged as a pair in vertically spaced parallel relation, a carriage movable upon said frame transversely of the length of fabric supported thereon, means for moving said carriage, cyclically operable means carried by said carriage for uniting each pair of unwoven warps, said cyclically operable means including means for engaging a pair of said warps and for rendering said carriage moving means ineffective upon such engagement, and means operative upon completion of the uniting of said pair of warps to render said carriage moving means effective to advance said carriage into engagement with another pair of said warps.

References Cited in the file of this patent

UNITED STATES PATENTS

| | | |
|---|---|---|
| 1,383,130 | Lea | June 28, 1921 |
| 2,256,532 | Steiner | Sept. 23, 1941 |
| 2,489,488 | Haack | Nov. 29, 1949 |
| 2,698,986 | Brown | Jan. 11, 1955 |
| 2,748,444 | Rice | June 5, 1956 |